(12) United States Patent
Xu et al.

(10) Patent No.: US 12,219,648 B2
(45) Date of Patent: *Feb. 4, 2025

(54) DATA COMMUNICATION WHILE IN RRC INACTIVE STATE

(71) Applicant: Apple Inc., Cupertino, CA (US)

(72) Inventors: Fangli Xu, Beijing (CN); Haijing Hu, Haijing (CN); Dawei Zhang, Saratoga, CA (US); Longda Xing, San Jose, CA (US); Murtaza A. Shikari, Mountain View, CA (US); Sethuraman Gurumoorthy, San Jose, CA (US); Sree Ram Kodali, Sunnyvale, CA (US); Srinivasan Nimmala, San Jose, CA (US); Srirang A. Lovlekar, Cupertino, CA (US); Xu Ou, San Jose, CA (US); Yuqin Chen, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/331,235

(22) Filed: Jun. 8, 2023

(65) Prior Publication Data

US 2023/0319947 A1 Oct. 5, 2023

Related U.S. Application Data

(63) Continuation of application No. 17/562,685, filed on Dec. 27, 2021, now Pat. No. 11,765,784, which is a (Continued)

(30) Foreign Application Priority Data

Jul. 10, 2019 (CN) .......................... 201910619666.8

(51) Int. Cl.
*H04W 76/27* (2018.01)
*H04L 69/28* (2022.01)
(Continued)

(52) U.S. Cl.
CPC ............. *H04W 76/27* (2018.02); *H04L 69/28* (2013.01); *H04W 36/0011* (2013.01);
(Continued)

(58) Field of Classification Search
CPC . H04W 76/27; H04W 36/0011; H04W 36/04; H04W 68/005; H04W 74/0833; H04W 76/10; H04L 69/28
See application file for complete search history.

(56) References Cited

U.S. PATENT DOCUMENTS 10,499,448 B2 12/2019 Mallick
11,252,778 B2 2/2022 Xu
(Continued)

FOREIGN PATENT DOCUMENTS

CN 109982397 7/2019
EP 3506708 7/2019

OTHER PUBLICATIONS

Office Action for Chinese Application for Invention No. 201910619666.8; Jan. 28, 2023.
(Continued)

*Primary Examiner* — Diane D Mizrahi
(74) *Attorney, Agent, or Firm* — Kowert, Hood, Munyon, Rankin & Goetzel, P.C.

(57) ABSTRACT

This disclosure relates to performing data communication while in an inactive state in a cellular communication system.

18 Claims, 17 Drawing Sheets

Related U.S. Application Data continuation of application No. 16/918,164, filed on Jul. 1, 2020, now Pat. No. 11,252,778.

(51) Int. Cl.
  *H04W 36/00*    (2009.01)
  *H04W 36/04*    (2009.01)
  *H04W 68/00*    (2009.01)
  *H04W 74/0833*  (2024.01)
  *H04W 76/10*    (2018.01)

(52) U.S. Cl.
  CPC ......... *H04W 36/04* (2013.01); *H04W 68/005* (2013.01); *H04W 74/0833* (2013.01); *H04W 76/10* (2018.02)

(56) References Cited

U.S. PATENT DOCUMENTS

| | | |
|---|---|---|
| 2018/0227851 A1 | 8/2018 | Kubota |
| 2019/0274183 A1* | 9/2019 | Pelletier .............. H04W 52/365 |
| 2020/0029262 A1 | 1/2020 | Kim |
| 2020/0196349 A1 | 6/2020 | He |
| 2020/0229111 A1 | 7/2020 | Kim |

OTHER PUBLICATIONS

LG Electronics Inc. "UL data transmission in RRC_Inactive"; 3GPP TSG-RAN WG2 Meeting #96 R2-168280; Nov. 14, 2016.
InterDigital Communications "Uplink Data Transmissions in Inactive State"; 3GPP TSG-RAN WG2 R2-168469; Nov. 14, 2016.
Huawei et al. "UL data transmission in RRC_Inactive"; 3GPP TSG-RAN WG2 R2-168544; Nov. 14, 2016.

* cited by examiner

DATA COMMUNICATION WHILE IN RRC INACTIVE STATE

PRIORITY DATA

This application is a continuation of U.S. patent application Ser. No. 17/562,685, entitled "Data Communication while in RRC Inactive State", filed Dec. 27, 2021 which is a continuation of U.S. patent application Ser. No. 16/918, 164, entitled "Data Communication while in RRC Inactive State," filed Jul. 1, 2020, now issued as U.S. Pat. No. 11,252,778, which claims benefit of priority to Chinese Application No. 201910619666.8, titled "Data Communication while in RRC Inactive State", filed Jul. 10, 2019, which are hereby incorporated by reference in their entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for performing data communication while in an inactive state in a cellular communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments are presented herein of apparatuses, systems, and methods for performing data communication while in an inactive state in a cellular communication system.

The data communication that can be performed may be regulated, e.g., to certain services, certain device types, certain types of communication, and/or in any of various other ways. For example, in some instances, the data communication may be limited (e.g., at least for an initial uplink communication while in the inactive state) to communication of small amounts of data. The configuration information regulating such data communication may be provided by a cellular network to a wireless device communicating with the cellular network, and/or may be pre-agreed upon (e.g., by proprietary agreement and/or in accordance with a cellular communication standard), among various possibilities.

There may be multiple possible mechanisms for performing the data communication. For an initial uplink communication, it may be possible for the network to provide pre-configured uplink grants for use while in the inactive state. As another possibility, a wireless device may be able to perform an uplink communication while in the inactive state using a random access channel procedure. For an initial downlink communication, it may be possible for the network to facilitate the downlink communication using a paging message. For example, downlink data may be provided with a paging message, or a downlink assignment may be provided with a paging message, or an indication to perform the downlink transmission while remaining in the inactive state may be provided with a paging message. In the latter instance, the wireless device may receive the initial downlink communication during a pre-configured downlink assignment, or may perform the downlink communication while in the inactive state using a random access channel procedure.

Once an initial data communication has been performed while in the inactive state, an activity timer may be used to support further data communication in the inactive state for a period of time. While such a timer is running at a wireless device, the wireless device may monitor a control channel provided by its serving cell for further (e.g., dynamically configured) uplink grants and/or downlink assignments, and may perform further uplink and/or downlink communication in accordance with the scheduled assignments/grants.

If desired, one or more additional timers may be used to further regulate how and/or when data communication is performed while in the inactive state. For example, a backoff timer may be used to limit the frequency at which uplink transmissions are performed while in the inactive state, in some instances. Other timers, and/or other manners of operation for the activity timer and/or the backoff timer, are also possible.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
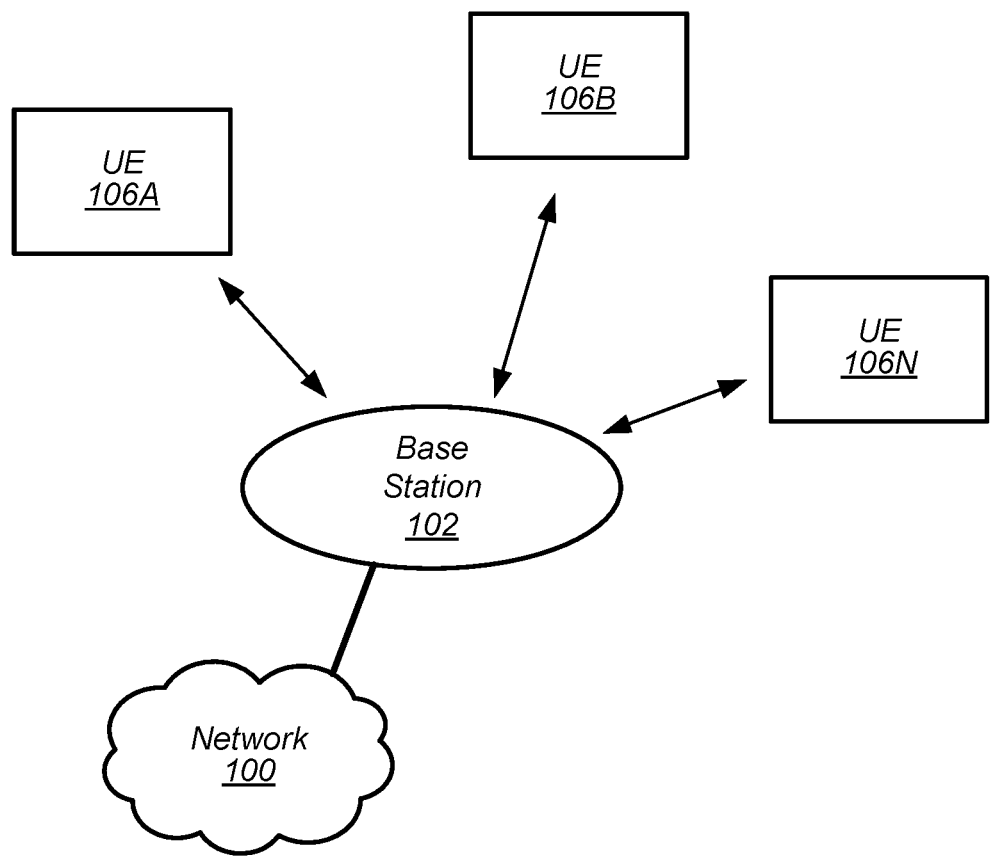
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
RAN: Radio Access Network
RNA: RAN Notification Area
TX: Transmission/Transmit
RX: Reception/Receive
LAN: Local Area Network
WLAN: Wireless LAN
AP: Access Point
RAT: Radio Access Technology
IEEE: Institute of Electrical and Electronics Engineers
Wi-Fi: Wireless Local Area Network (WLAN) RAT based on the IEEE 802.11 standards

Terms

The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
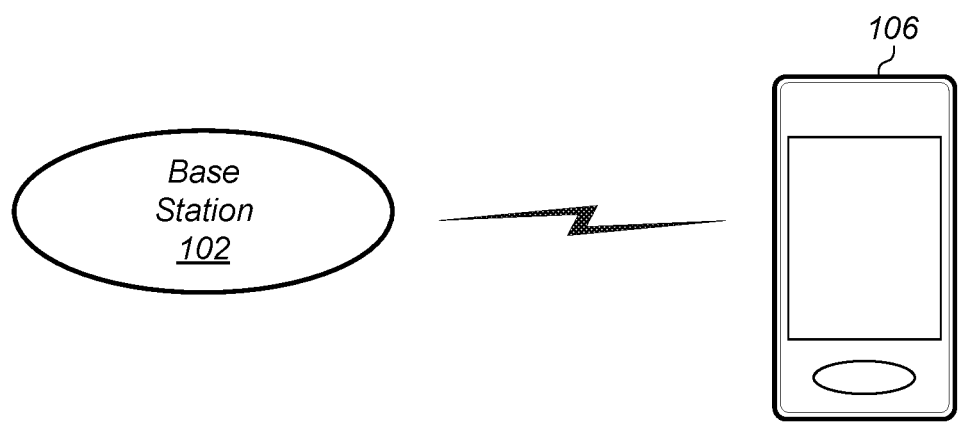
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

In some embodiments, the UE 106 may be configured to perform data communication while operating in an RRC inactive state, at least according to the various methods as described herein.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuitry, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
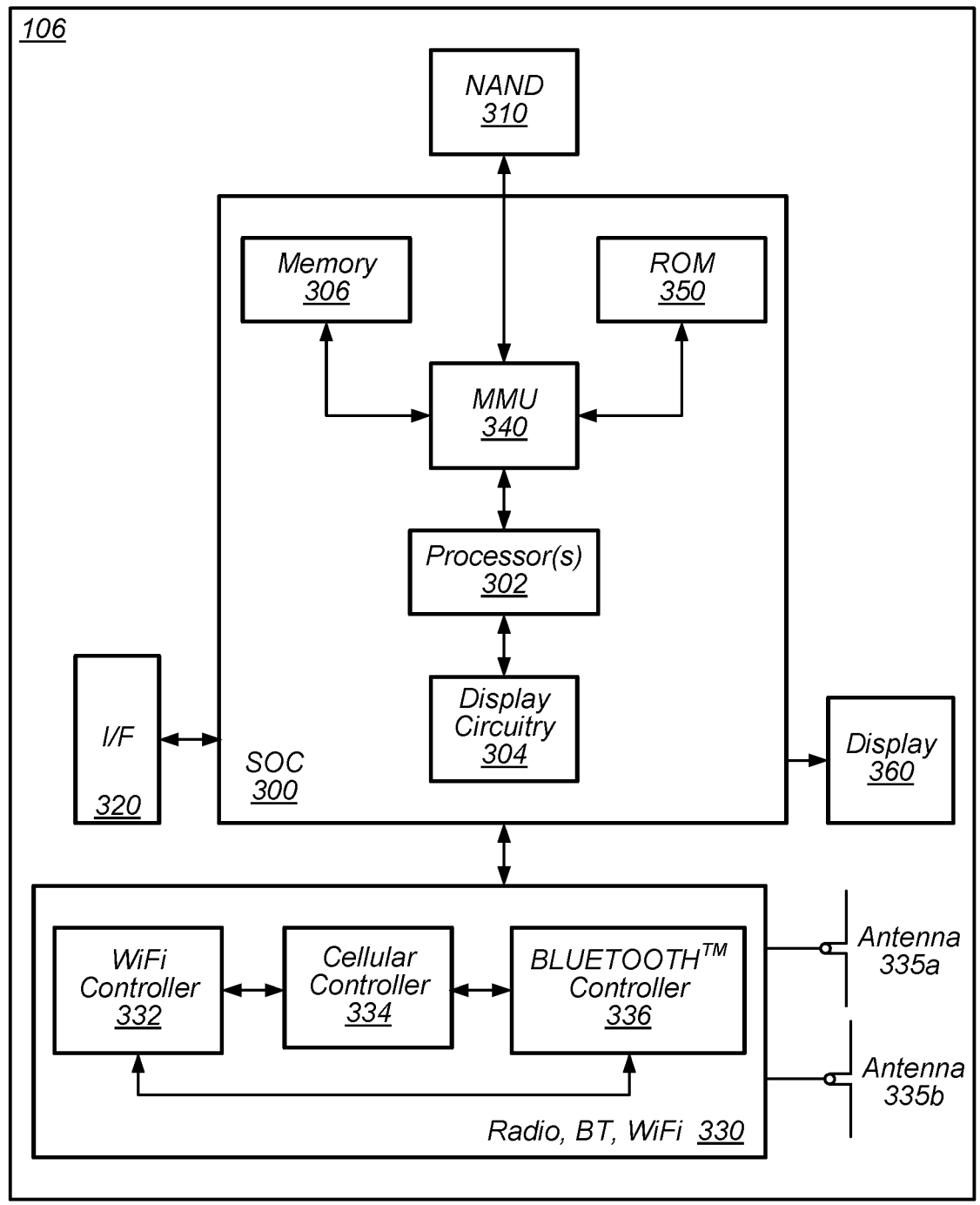
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for at least UE 106 to perform data communication while in an inactive state in a cellular communication system. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform data communication while in an inactive state in a cellular communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 332, a cellular controller (e.g. NR controller) 334, and BLUETOOTH™ controller 336, and in at least some embodiments, one or more or all of these controllers may be implemented as respective integrated circuits (ICs or chips, for short) in communication with each other and with SOC 300 (and more specifically with processor(s) 302). For example, Wi-Fi controller 332 may communicate with cellular controller 334 over a cell-ISM link or WCI interface, and/or BLUETOOTH™ controller 336 may communicate with cellular controller 334 over a cell-ISM link, etc. While three separate controllers are illustrated within radio 330, other embodiments have fewer or more similar controllers for various different RATs that may be implemented in UE device 106.

Figure 4:
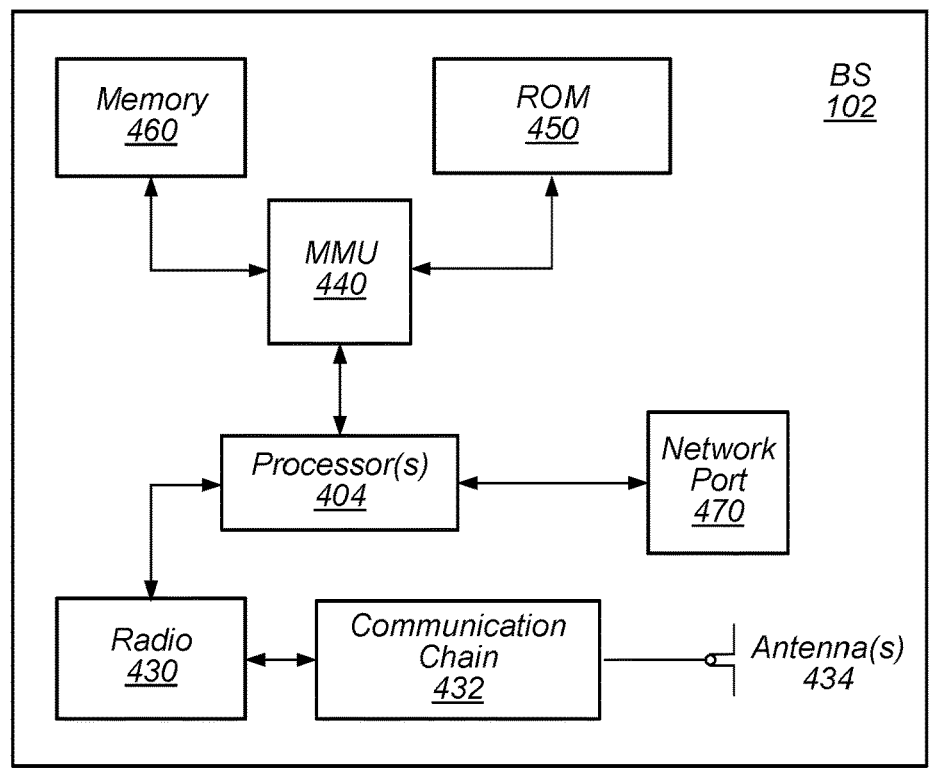
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. The base station 102 may operate according to the various methods as disclosed herein for wireless devices to perform data communication while in an inactive state in a cellular communication system.

Figure 5:
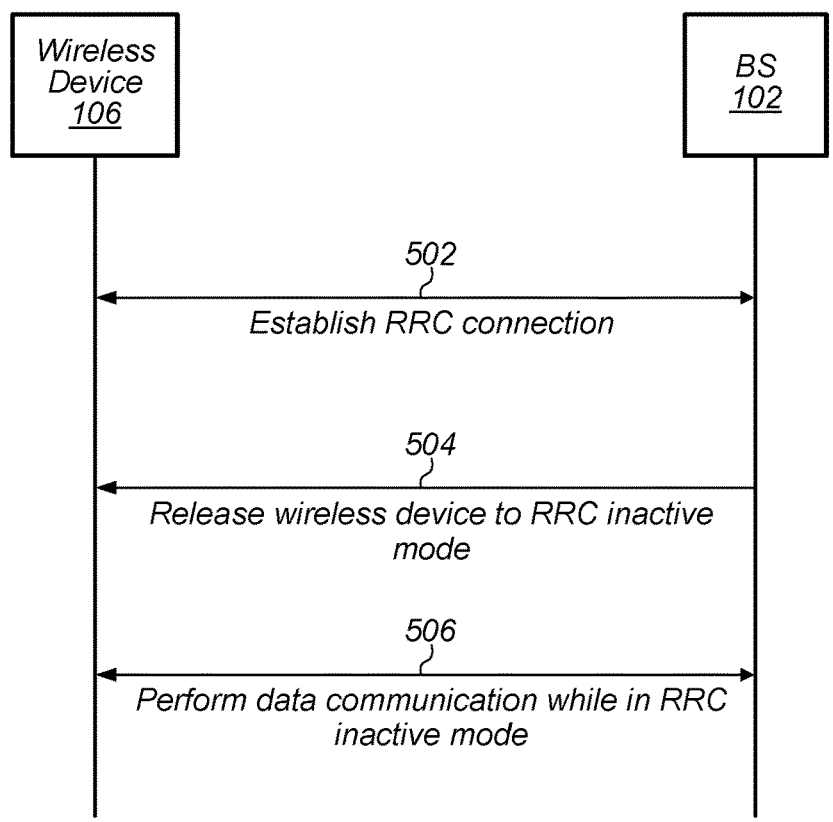
FIG. 5 is a communication flow diagram illustrating an exemplary possible method for performing data communication while in an inactive state in a cellular communication system, according to some embodiments.

FIG. 5—Data Communication while in an Inactive State

Multiple cellular communication technologies include the use of a radio resource control (RRC) protocol, e.g., which may facilitate connection establishment and release, radio bearer establishment, reconfiguration, and release, and/or various other possible signaling functions supporting the air interface between a wireless device and a cellular base station.

A wireless device may commonly operate in one of multiple possible states with respect to RRC. For example, in LTE, a wireless device may operate in an RRC connected state (e.g., in which the wireless device can perform continuous data transfer, and in which handover between cells is managed by the network and access stratum context information is retained for the wireless device), or in an RRC idle state (e.g., in which the wireless device may operate in a more battery efficient state when not performing continuous data transfer, in which the wireless device may handle it's cell re-selection activities, and in which the network may not retain access stratum context information for the wireless device).

In addition to RRC connected and RRC idle states, it may also be possible to support one or more other types of RRC states for a wireless device, at least according to some embodiments. For example, for NR, an RRC inactive state in which a wireless device may be able to operate in a relatively battery efficient state while the network also retains at least some access stratum context information may be supported. At least according to some embodiments, such a state may employ wireless device based mobility, e.g., such that a wireless device can move within a radio access network notification area (RNA) without notifying the next generation (NG) radio access network (RAN). While in this state, a wireless device may perform cell re-selection and system information acquisition for itself. At the same time, the last serving base station (e.g., gNB) may keep the wireless device context and the NG connection with the 5G core network (CN) associated with the wireless device, e.g., to facilitate easier transition back to an RRC connected state. When paging a wireless device in the RRC inactive state, RNA specific parameters may be used by the RAN, for example including a UE specific DRX and UE Identity Index value (e.g., I-RNTI).

A wireless device operating in such an RRC inactive state may perform RNA updates periodically (e.g., based on a configured periodic RNA update timer) and/or in an event based manner, e.g., when the wireless device moves out of its current configured RNA to a different RNA, according to some embodiments.

Use of an RRC inactive state may help reduce the network signaling overhead for a wireless device's connection, at least in some instances. For example, for a wireless device with infrequent data transmissions, utilizing such an RRC inactive state may reduce the amount of mobility related signaling (e.g., for handovers) needed compared to an RRC connected state, e.g., since the wireless device may be able to manage its own cell re-selection process when moving between cells. For such a wireless device, utilizing an RRC inactive state may also reduce the amount of connection setup related signaling needed compared to an RRC idle state, e.g., since the network may retain at least some context information for the wireless device. This may directly reduce the signaling latency associated with a transition to an RRC connected state.

As another potential benefit, such a state may reduce the control plane delay for a wireless device, e.g., in comparison to operating in an RRC idle state. For example, a reduced access stratum connection setup period and/or non-access stratum connection setup period may be possible for an RRC inactive state relative to an RRC idle state. The time to move from a battery efficient state to the start of continuous data transfer may thus be reduced.

Additionally, such a state may improve the power saving capability of a wireless device, e.g., in comparison to operating in an RRC connected state. For example, while in RRC connected state, serving and/or neighboring cell measurements may be required more frequently than while in RRC inactive state, e.g., at least in line with a connected state discontinuous reception (C-DRX) period of the wireless device.

However, currently, while use of an RRC inactive state may reduce the delay to perform data communication relative to when operating in an RRC idle state, data communication in the RRC inactive state itself is not supported, so the delay to perform data communication may still be greater than when operating in the RRC connected state. Thus, for at least some types of devices and/or communication types, there may be benefits to supporting data communication while in the RRC inactive state, e.g., at least under some circumstances.

Accordingly, FIG. 5 is a communication flow diagram illustrating such a method for a wireless device (e.g., a wireless user equipment (UE) device) to perform data communication while in an inactive state in a cellular communication system, which may help reduce wireless device power consumption and/or reduce the access time delay from the RRC inactive state, at least according to some embodiments.

Aspects of the method of FIG. 5 may be implemented by a wireless device, e.g., in conjunction with a cellular base station, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with NR and/or 3GPP specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device and the cellular base station may establish a RRC connection. For example, the wireless device may attach to a cell provided by the cellular base station. Establishing the RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station, at least according to some embodiments. After establishing the RRC connection, the wireless device may operate in an RRC connected state. While in the RRC connected state, the wireless device may undergo handover from one serving cell (e.g., provided by a cellular base station) to another serving cell (e.g., provided by a different cellular base station), at least in some embodiments.

In 504, the wireless device may transition from the RRC connected state to the RRC inactive state. Transitioning from the RRC connected state to the RRC inactive state may include the wireless device receiving an indication releasing or deactivating the RRC connection, and/or otherwise determining that a trigger has occurred to release or deactivate the RRC connection. Based at least in part on the indication (and/or other trigger), the wireless device may transition from the RRC connected state to an RRC inactive state. The indication may be received from a cellular base station (e.g., the base station with which the RRC connection was established, or possibly a different cellular base station if handover has occurred one or more times). While in the RRC inactive state, the wireless device may be paged by the cells of the current RNA if the network has data for the wireless device based on the wireless device's association with the current RNA.

In 506, the wireless device may perform data communication while in the RRC inactive state. It may be the case that data communication is supported under certain specific/configured circumstances, such as when one or more specified conditions are met, at least according to some embodiments. Thus, at least in some instances, the wireless device may determine whether to perform the data communication while in the RRC inactive state or to resume the RRC connection to perform the data communication. For example, the conditions under which data communication is supported could include a condition on the amount of data to be transmitted, such as that data amounts under a certain data threshold are allowed to be communicated while in the RRC inactive state (e.g., assuming any other conditions for communicating data while in the RRC inactive state are met), while for data amounts above the data threshold, the wireless device may be expected to resume the RRC connected state to communicate the data. As another possibility, data communication while in the RRC inactive state could be supported for certain types of wireless devices such as those that commonly perform data communications with small data amounts and/or in a periodic manner (e.g., machine type communication (MTC) devices, wearable devices, etc.), and/or for certain types of data communications (e.g., again assuming any other conditions for communicating data while in the RRC inactive state are met), and not supported for other types of wireless devices and/or types of data communication. As a still further possibility, one or more timers may be used to control when data communication in the RRC inactive state is supported and is not supported. Note that any of these various conditions (among other possible conditions) may be used individually or in combination to regulate when data communication is and is not performed between a wireless device in RRC inactive state and a cellular network.

The conditions and/or parameters under which data communication is supported while in RRC inactive state may be determined in any of a variety of possible ways. As one possibility, some or all such conditions/parameters may be specified by a cellular communication standard according to which the wireless device and the cellular base station are configured to communicate. As another possibility, the cellular base station may indicate some or all such conditions/parameters in broadcast system information for the cellular base station. As still another possibility, the cellular base station could configure some or all such conditions/parameters in a manner specific to the wireless device, such as in RRC configuration or reconfiguration information during the previously established RRC connection, or in paging information provided to the wireless device while in RRC inactive state. Thus, at least in some instances, the wireless device may determine whether to perform the data communication with the cell while in the RRC inactive state or to resume RRC connected state to perform the data communication based at least in part on configuration information received from the cellular base station.

Additionally or alternatively, it may be possible for a wireless device to determine whether to perform data communication with the cell while in the RRC inactive state or to transition to RRC connected state to perform the data communication, e.g., based on traffic/application usage pattern and/or learnt behaviors, among various possibilities. Thus, for example, if a wireless determines that it would be better served by performing a data communication in RRC connected state, the wireless device may choose to do so even if performing the data communication while remaining in the RRC inactive state is also supported.

An initial data communication while in the RRC inactive state, e.g., once the wireless device determines to perform the data communication while in the RRC inactive state, may be performed in any of multiple possible ways. For example, for an initial uplink communication that the wireless device has determined to perform while in the RRC inactive state, it may be the case that the cellular base station provides one or more pre-configured uplink grants (e.g., which could be configured and indicated generally in broadcast system information or configured and indicated specifically for the wireless device) for initial uplink data communications by while in RRC inactive state. As another possibility (e.g., if such a grant is not available or possibly if the next such grant would not be available for an amount of time greater than a time threshold), it may be the case that the wireless device can perform the data communication during a random access channel (RACH) procedure. For example, the uplink data could be provided with the message 3 of a RACH procedure, in some instances.

For an initial downlink communication while the wireless device is in RRC inactive state, at least according to some embodiments, the cellular base station may provide information relating to the downlink communication in a paging message provided to the wireless device. For example, as one possibility, the downlink data could be included in the paging message itself. As another possibility, downlink assignment information for the downlink data may be provided in the paging message, and the wireless device may follow up by receiving the downlink data in accordance with the downlink assignment information. As still another possibility, the paging message provided to the wireless device could include an indication of whether to receive the downlink data while in the RRC inactive state or to resume RRC connected state to receive the downlink data. In such a scenario, if the paging message indicates to receive the downlink data while in the RRC inactive state, the wireless device may utilize a next available pre-configured downlink assignment to receive the downlink data, as one possibility. As another possibility (e.g., if such an assignment is not available or possibly if the next such assignment would not be available for an amount of time greater than a time threshold), it may be the case that the wireless device can perform the data communication during a random access channel (RACH) procedure. For example, the downlink data could be received with the message 4 of a RACH procedure, in some instances.

Note that at least in some instances, the wireless device may provide wireless device identification information with the data communicated while in RRC inactive state, which may include RRC inactive state specific wireless device identification information, such as I-RNTI information for the wireless device.

As previously noted herein, it may be the case that one or more timers may be used to regulate when and/or how data is communicated while in RRC inactive state. As one such possible timer, an inactive state inactivity timer may be initiated based at least in part on performing an initial data communication while in the RRC inactive state. Once the inactive state inactivity timer is running, the wireless device may monitor a control channel of the cell (e.g., possibly continuously, or possibly discontinuously, e.g., according to a RRC inactive state DRX pattern), and may thus be able to perform (e.g., additional) data transmission and/or reception with the cell according to scheduled/configured grants/assignments provided using the control channel while the inactive state inactivity timer is running. At least according to some embodiments, the inactive state inactivity timer may be reset/restarted based on data transmission/reception and/or based on control channel scheduling, e.g., such that the period in which data communication can be performed while in the RRC inactive state can be extended beyond the base length of the inactive state inactivity timer.

In some instances, there may be a configured delay between an initial data communication while in RRC inactive state and initiating the inactive state inactivity timer. For example, a round trip time (RTT) timer may be initiated when a first data communication while in the RRC inactive state is performed by the wireless device, e.g., to account for processing time. While the RTT timer is running, the wireless device may be configured to refrain from performing further data communication. Once the RTT timer expires, the inactive state inactivity timer may be initiated, or alternatively, a backoff timer may be initiated, e.g., if such a timer is configured and one or more conditions for initiating the backoff timer are met.

If configured, such a backoff timer may be used to regulate the frequency and/or overall amount of data communication that is performed by a wireless device while in RRC inactive state. As one possibility, the backoff timer may be initiated upon an uplink transmission, or upon RTT timer expiry, while in RRC inactive state. As another possibility, the backoff timer may be initiated upon uplink data arrival (e.g., at baseband of the wireless device from higher layers of the wireless device). The wireless device may be configured to refrain from performing uplink data communication while the backoff timer is running. Once the backoff timer expires, the wireless device may perform the uplink data communication (e.g., if the backoff timer is initiated upon uplink data arrival), or may initiate the inactive state inactivity timer (e.g., if the backoff timer is initiated upon uplink transmission or RTT timer expiry). Note that at least according to some embodiments, it may be the case that the backoff timer is stopped if new downlink data arrives while the backoff timer is running.

In some embodiments, the wireless device may also or alternatively implement a waiting timer, e.g., to limit the access delay to perform a data communication. For example, the waiting timer may be initiated when uplink data is received at a baseband layer of the wireless device from a higher layer of the wireless device while the wireless device is in the RRC inactive state. If the wireless device is able to perform an uplink communication while in the RRC inactive state to transmit the uplink data while the waiting timer is running, the waiting timer may be stopped. However, if the waiting timer expires and the wireless device has not successfully performed the uplink communication while in the RRC inactive state, the wireless device may resume RRC connected state to transmit the uplink data. This may provide a mechanism to mitigate possible delays that could be caused by unsuccessful uplink transmission attempts, a backoff timer (e.g., if configured), and/or other possible sources of delay. Such a timer may be configured differently for different types of data, and/or based on any of various other possible considerations, if desired.

As previously noted, while in RRC inactive state, it may be the case that the wireless device re-selects to a new cell. Accordingly, it may be useful to provide a mechanism for handling scenarios in which such re-selection is performed while a data communication is being performed. As one such mechanism, if cell re-selection to another (e.g., a "second") cell is performed prior to completing a data communication while in RRC inactive state, the wireless device may perform the data communication with the second cell while in the RRC inactive state, e.g., based at least in part on the cell re-selection to the second cell being performed prior to completing the data communication. As another possibility, the wireless device may resume RRC connected state to perform the data communication with the second cell, e.g., based at least in part on the cell re-selection to the second cell being performed prior to completing the data communication. In either scenario, it may be the case that any data buffered in baseband layers for transmission to the original cell may be discarded and regarded as unsuccessfully delivered, and may be retransmitted in the second cell.

Thus, using the techniques described herein with respect to the method of FIG. 5, it may be possible for a wireless device to perform data communication while in RRC inactive state, at least in some circumstances. Such techniques may, for example, allow for small amounts of data to be transmitted infrequently without the increased signaling overhead, power consumption, and access delay that can result from transitioning to RRC connected state to perform such data communications. This may be beneficial for wireless device types that typically perform such small and/or infrequent data communications, for data types that are typically transmitted using such small and/or infrequent data communications, for battery constrained (e.g., due to low battery capacity and/or long battery life expectations) wireless devices, and/or in various other scenarios, among various possibilities, at least according to some embodiments.

FIGS. 6-20—Additional Information

FIGS. 6-20 and the following information are provided as being illustrative of further considerations and possible implementation details relating to the method of FIG. 5, and are not intended to be limiting to the disclosure as a whole. Numerous variations and alternatives to the details provided herein below are possible and should be considered within the scope of the disclosure.

RRC inactive state is an operating mode supported in 5G NR, which may reduce signaling overhead and power consumption for a UE relative to RRC connected state while improving the UE access latency relative to RRC idle state. For example, for a UE with infrequent data transmissions, operating in RRC inactive state may reduce the mobility related signaling relative to operating in RRC connected state (e.g., handovers may be avoided), and operating in RRC inactive state may reduce the connection setup related signaling relative to operating in RRC idle state. The time to move from a battery efficient state to the start of continuous data transfer (e.g., the control plane delay) may also be reduced. For example, a UE in RRC inactive state may reduce the control plane delays due to access stratum connection setup and non-access stratum connection setup periods relative to a UE in RRC idle state. Power consumption may be reduced relative to operation in RRC connected state, e.g., as measurements can be performed less frequently (e.g., in the RRC connected state, it may be the case that measurements must meet the connected state measurement requirements based on the connected state discontinuous reception (C-DRX) period.

At least according to some embodiments, transitions between RRC inactive and connected states may be performed without impacting the core network. The UE and the NG RAN (e.g., the last serving gNB of the UE) may store the UE access stratum context while a UE is in RRC inactive state. Mobility in RRC inactive state may be handled in a UE centric manner, e.g., similar to RRC idle state, with cell re-selection being performed by the UE. Such mobility activities and the precise RRC state of a UE may be hidden to the core network. State changes from RRC inactive state to RRC connected state and vice versa may be possible, as well as changes from RRC inactive state to RRC idle state. Note that transitions from RRC idle state to RRC inactive state may not be supported, at least in some instances.

Similar to the core network tracking area concept used to support UE mobility in idle state, inactive state may use a RAN notification area (RNA), which may be configured by the gNB on a per UE basis. A UE may be reachable within its configured RNA via a RAN-initiated paging (e.g., according to a UE specific DRX cycle) using a RAN configured UE ID (I-RNTI), e.g., by all gNBs within the RNA. RNA updates may be triggered periodically (e.g., based on a configured periodic RNA update timer) and when moving outside of the configured RNA.

Figure 6:
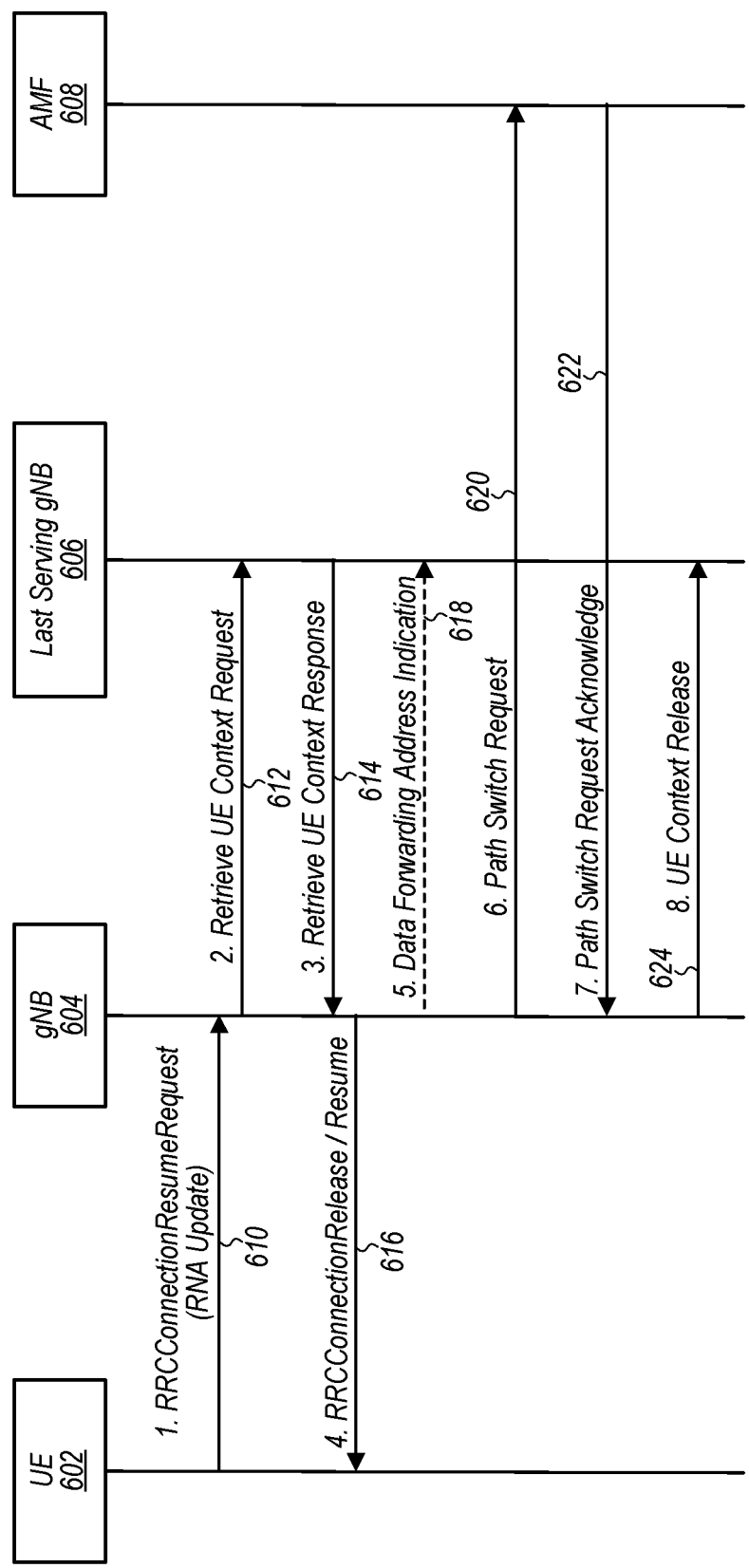
FIG. 6 is a communication flow diagram illustrating aspects of an exemplary possible model for an inactive state in a cellular communication system, according to some embodiments.

FIG. 6 is a communication flow diagram illustrating possible signaling flow for performing a RNA update procedure while in RRC inactive state. As shown, in 610 a UE 602 may provide a RRCConnectionResumeRequest (e.g., with an indication to perform a RNA update) to its current serving gNB 604. In 612, the current serving gNB 604 may provide a retrieve UE context request to the last serving gNB 606. In 614, the last serving gNB 606 may provide a retrieve UE context response to the current serving gNB 604. In 616, the current serving gNB 604 may provide a RRCConection-Release/Resume message to the UE 602. In 618, the current serving gNB 604 may also provide a data forwarding address indication to the last serving gNB 606. In 620, the current serving gNB 604 may further provide a path switch request to an AMF 608 (e.g., an AMF serving the RNA). In 622, the AMF 608 may provide a path switch request acknowledge to the current serving gNB 604. In 624, the current serving gNB 604 may provide a UE context release message to the last serving gNB 606.

Currently, data transmission while in the RRC inactive state is not supported. Thus, without the possibility to directly perform data transmission while in RRC inactive state, in case of uplink data arrival, a UE may trigger a RRC connection resume procedure to enter RRC connected state, and then perform uplink data transmission (and possibly also downlink data reception) in the connected state. Thus, a UE may still experience the latency of the RRC resume procedure as a potential delay to performing an uplink transmission while in RRC inactive state. In case of downlink data arrival while a UE is in RRC inactive state, the network may perform RAN paging for the inactive UE; upon receiving the paging, the UE may similarly trigger a RRC connection resume procedure to enter RRC connected state, and then perform downlink data reception (and possibly also uplink data transmission) in the connected state. Providing support for data transmission and/or reception while in the RRC inactive state could thus potentially allow for reduced delays for data transmission/reception, and/or for reduced signaling overhead (e.g., as it may be possible to avoid the signaling overhead for RRC state transitions), at least according to some embodiments.

For example, at least in some embodiments, the signaling load for a RRC resume procedure may include 3 RRC messages: a RRC connection resume request message, a RRC connection resume message, and a RRC connection resume complete message. When additionally considering the time and signaling to perform a random access channel procedure to initiate the RRC resume procedure, and various processing and scheduling delays between message transmissions, this delay and signaling overhead can potentially have a significant impact on overall communication performance and user experience. This may be particularly impactful for certain types of wireless devices that have limited battery capacity and/or long battery life expectations, and also may be impactful for wireless devices in general.

Figure 7:
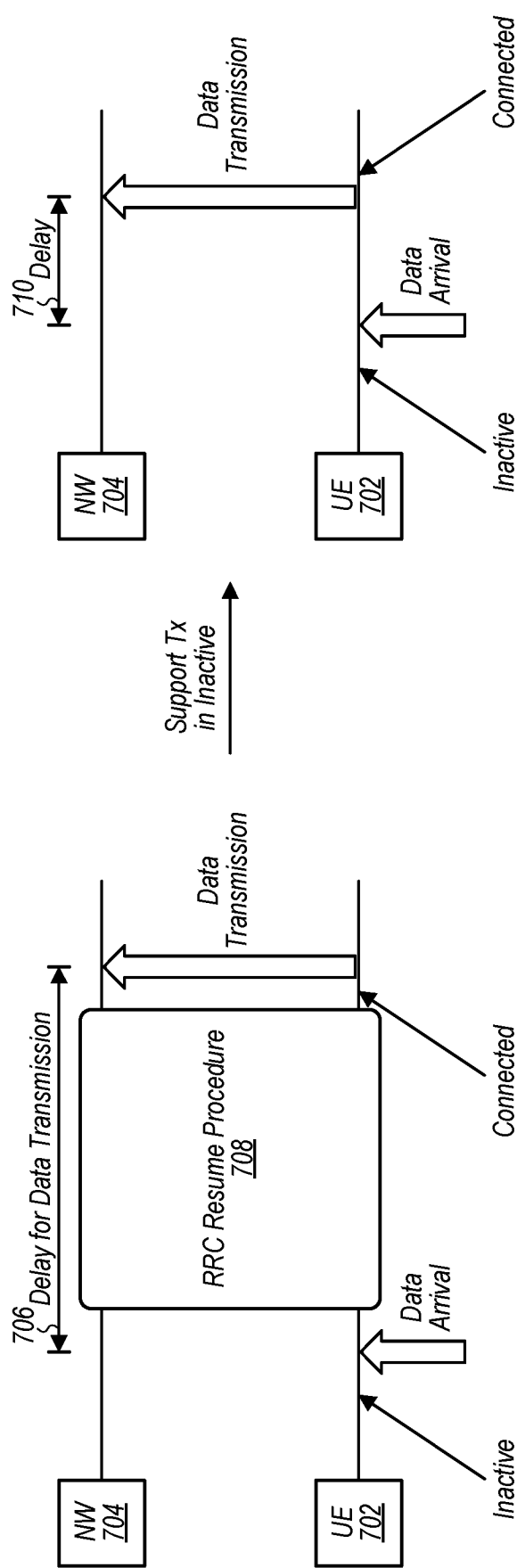
FIG. 7 illustrates a communication timeline comparing possible delays when resuming operating in a connected state to perform an uplink communication and when performing an uplink communication while in an inactive state in a cellular communication system, according to some embodiments.

FIG. 7 is a communication timeline illustrating the potential difference in uplink data delays when a UE 702 resumes operating in a connected state to perform an uplink communication with a cellular network 704 and when the UE 702 performs an uplink communication with the cellular network 704 while in an inactive state, according to some embodiments. As shown, the delay 706 between data arrival and data transmission if a RRC resume procedure 708 needs to be performed, as illustrated on the left side of FIG. 7, may be substantially greater than the delay 710 between data arrival and data transmission if the data transmission while in the inactive state is supported, at least according to some embodiments.

Figure 8:
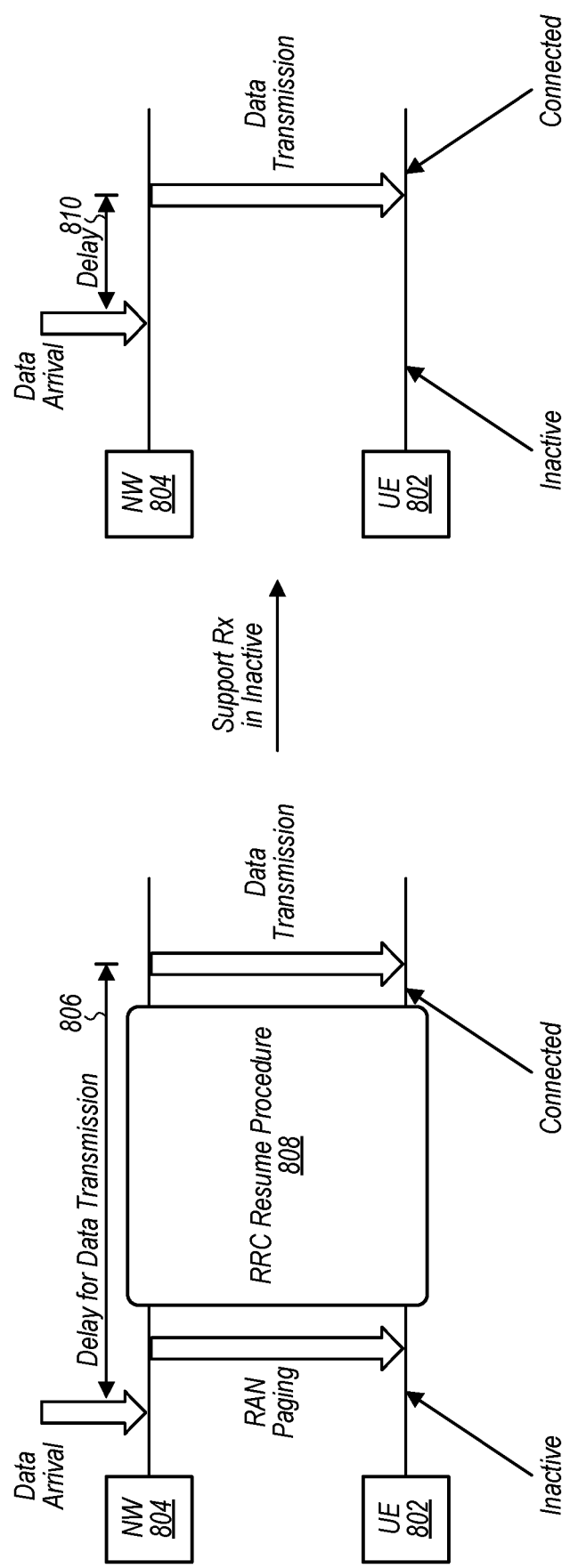
FIG. 8 illustrates a communication timeline comparing possible delays when resuming operating in a connected state to perform a downlink communication and when performing a downlink communication while in an inactive state in a cellular communication system, according to some embodiments.

FIG. 8 is a communication timeline illustrating the potential difference in downlink data delays when a UE 802 resumes operating in a connected state to perform an uplink communication with a cellular network 804 and when the UE 802 performs an uplink communication with the cellular network 804 while in an inactive state, according to some embodiments. As shown, the delay 806 between data arrival and data transmission if a RRC resume procedure 808 needs to be performed, as illustrated on the left side of FIG. 8, may be substantially greater than the delay 810 between data arrival and data transmission if the data transmission while in the inactive state is supported, at least according to some embodiments.

Figure 9:
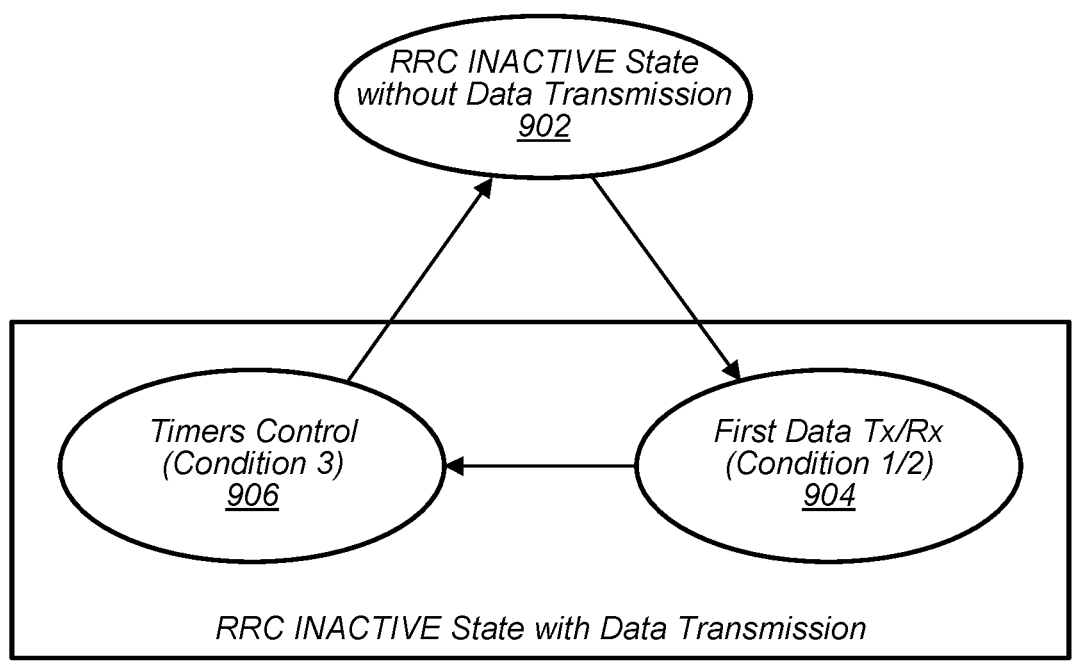
FIG. 9 illustrates aspects of possible conditions that could be used to regulate when data transmission is performed while in an inactive state, according to some embodiments.

According to one possible framework for supporting data transmission/reception while a UE is in the RRC inactive state, one or more conditions may be specified under which such data transmission/reception while a UE is in the RRC inactive state can be performed. FIG. 9 illustrates aspects of one such possible set of conditions that could be used to regulate when data transmission is performed while in inactive state, according to some embodiments. As shown, in 902, a UE may be in the RRC inactive state and not currently meeting the conditions for performing data transmission in the RRC inactive state. A first condition under which the UE may be able to perform data communication while in the RRC inactive state may include uplink data arriving (e.g., at baseband from upper layers of the UE), possibly with a requirement that the data amount is less than a specified threshold. A second condition under which the UE may be able to perform data communication while in the RRC inactive state may include the UE receiving a notification message from the network indicating to the UE to receive data while in the RRC inactive state. If either of the first condition or the second condition is met, in 904, the UE may perform a first data transmission/reception while in the RRC inactive state. In 906, the UE may determine subsequent data transmission/reception behavior based on one or more timers that may be used to control the amount of and/or frequency at which data communication is performed while in RRC inactive state. The timer(s) used may be used as a third condition that may impact whether a UE performs data communication while in the RRC inactive state.

For example, upon the first data transmission/reception, it may be the case that further data transmission is based on one or more of a "T_activity" timer, a "T_backoff" timer, and/or a "RTT timer". While the T_activity timer is running, it may be the case that data transmission/reception is allowed. The T_activity timer may be extended/reset based on each further data transmission/reception and/or based on PDCCH scheduling, among various possibilities. While the T_backoff timer is running, it may be the case that data transmission is not allowed. The T_backoff timer may be triggered by uplink data transmission (e.g., to enforce a backoff period after a transmission) and/or by uplink data arrival (e.g., to enforce a backoff period before transmitting uplink data) according to various embodiments. While the RTT timer is running, it may be the case that data transmission/reception is not allowed. The RTT timer may be configured to enforce a delay between triggering and starting T_activity and/or T_backoff. Note that the T_activity timer and the T_backoff timer can be used together or separately, according to various embodiments. The timer lengths (when whether/how they are configured to be used) can be configured via broadcast or dedicated signaling, separately or together, among various possibilities. Further, different timer values could be configured for uplink and downlink for some or all such timers, in some embodiments. If desired, a UE may (e.g., optionally) share initial grant and timer preferences via RRC signaling with the network, e.g., to aid the scheduling of the one or more timers, grants/assignments, and/or other inactive state data communication parameters. The network may be free to use this information (e.g., in addition to loading and other scheduling considerations), or to ignore this assistance information, at least in some instances.

Multiple transmission schemes for performing data communication in the RRC inactive state may be possible. Use of pre-configured grants/assignments, dynamic scheduling, and/or RACH procedures may be among such possible transmission schemes.

According to some embodiments, an initial uplink transmission while in the RRC inactive state may be directly performed when the available data amount is smaller than a configured uplink data threshold, and/or if the corresponding services are allowed to be transmitted while in RRC inactive state, and/or if the network is configured to always allow uplink data transmissions while in RRC inactive state. For such an initial uplink transmission, use of a pre-configured uplink grant may be made if available, or alternatively a RACH procedure may be used to perform the uplink transmission. A pre-configured grant can be configured via RRC signaling, e.g., via RRC dedicated signaling when triggering the UE to transition to RRC inactive state, or via broadcast system information from the currently camped cell. The network may be able to configure which service(s) (e.g., logical channel(s)) can be transmitted on the pre-configured grant. For example, an explicit indication for each allowed logical channel may be provided for a pre-configured grant, as one possibility. As another possibility, an implicit indication of the allowed logical channel(s) for a given pre-configured grant may be specified via a mapping between certain logical channels and certain physical resources (e.g., based on the numerology, transmission time interval, etc. of the pre-configured grant). A RACH procedure may be used in case there is no pre-configured uplink grant available, or if the type of data (service) of the uplink transmission is not allowed on any pre-configured uplink grants, among various possibilities. The first uplink transmission may be provided together with the UE's I-RNTI, e.g., to identify the wireless device to the network. The T_activity timer may be started upon performance of the first uplink transmission (e.g., possibly with a configured delay using the RTT timer, among various possibilities). Additionally, if desired, a "T_wait" timer may be used to control the uplink delay for the first uplink transmission. For example, the T_wait timer may be started upon the first uplink data arrival, and may be stopped upon the first uplink data transmission. Upon T_wait expiry (e.g., if the first uplink data was unable to be successfully transmitted for the length of the T_wait timer), the UE may trigger a RRC resume procedure to enter the RRC connected state, or may perform cell re-selection, in order to attempt to complete the uplink data transmission.

Figure 10:
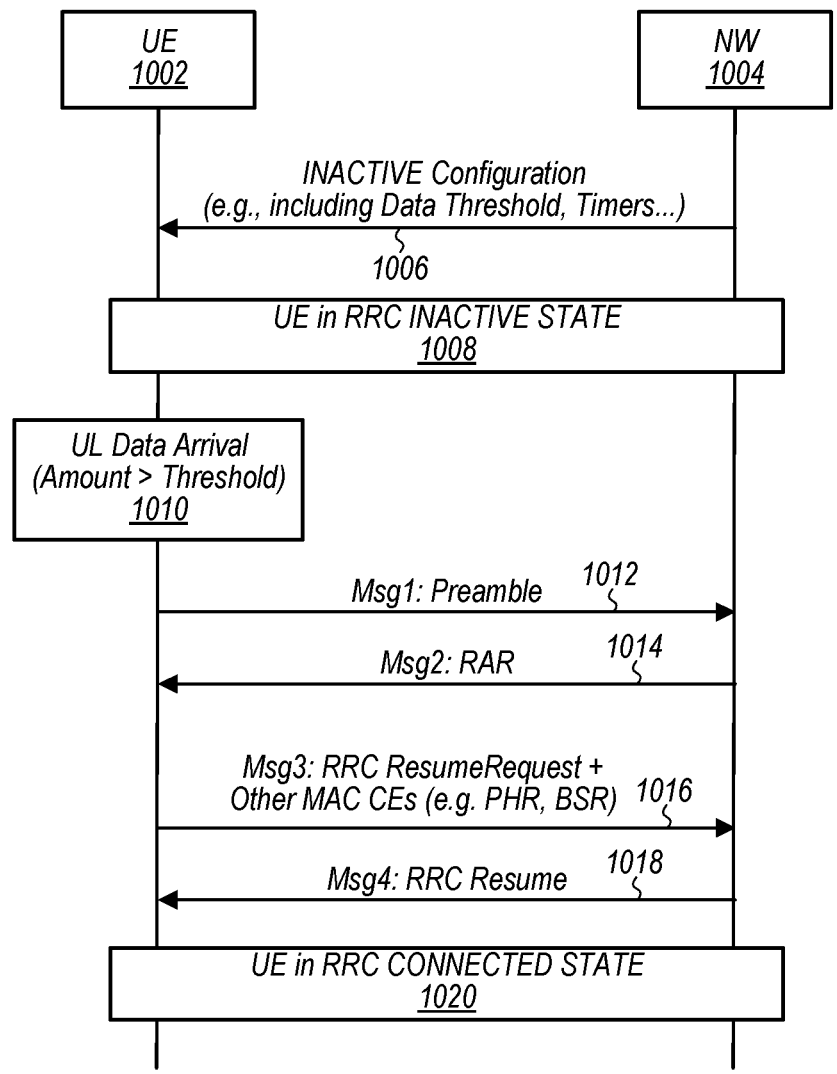
FIGS. 10-12 are communication flow diagrams illustrating various possible scenarios for performing an uplink communication while initially in an inactive state, according to some embodiments.
Figure 11:
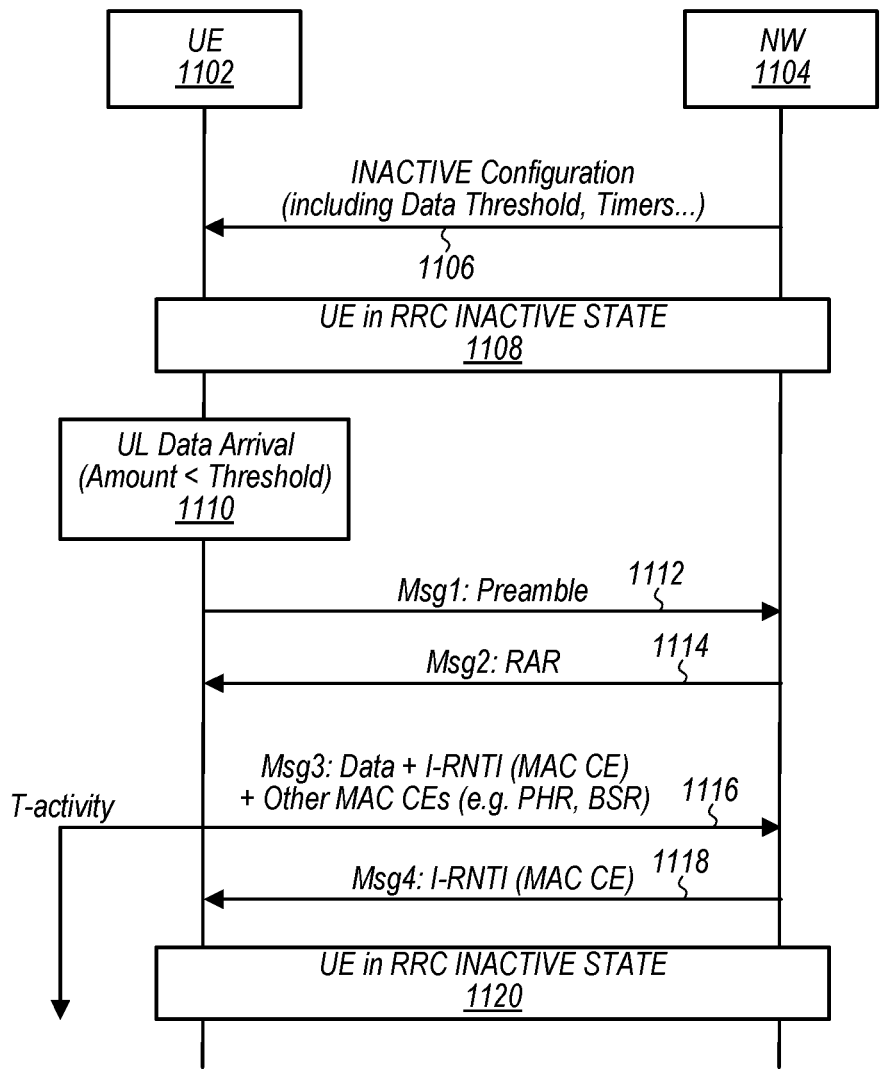
Figure 12:
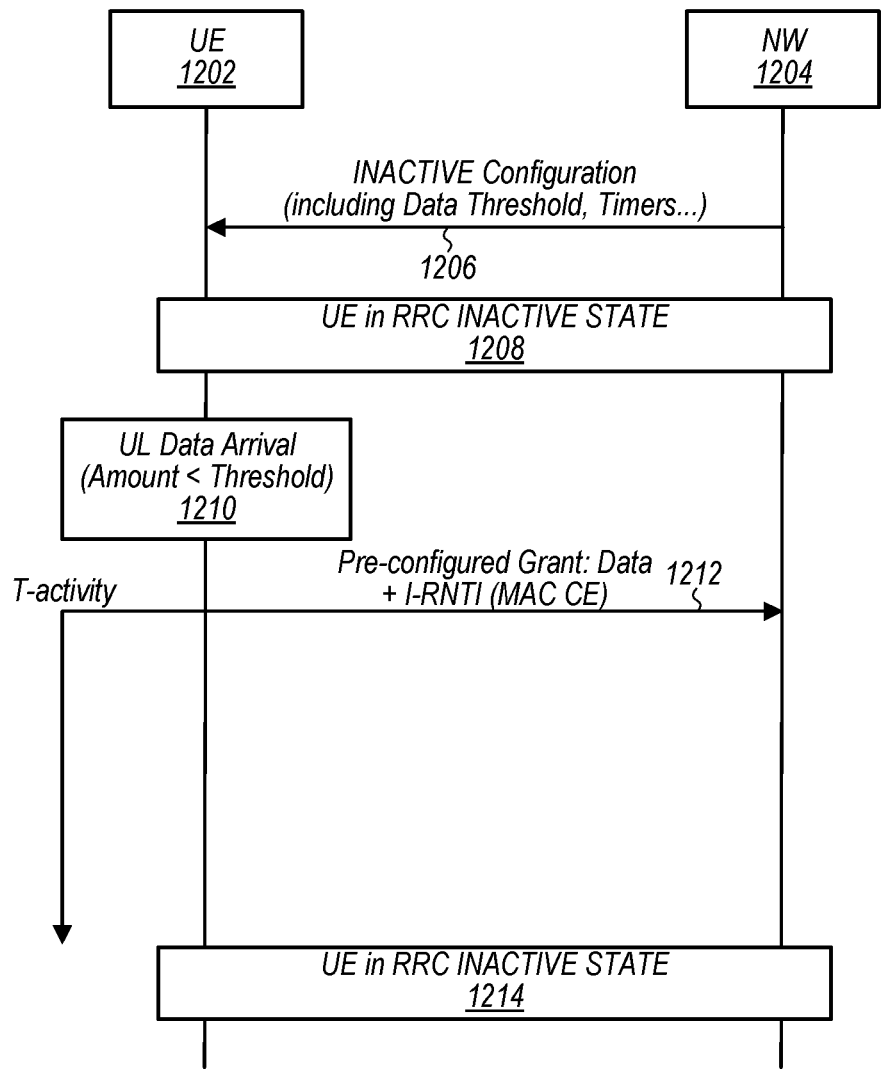

FIGS. 10-12 are communication flow diagrams illustrating various possible scenarios for performing an uplink communication while initially in inactive state, according to some embodiments. FIG. 10 illustrates a scenario in which the amount of uplink data that arrives is greater than a configured uplink data threshold for transmission while in the RRC inactive state. As shown, in this scenario, in 1006, the network 1004 may release the UE 1002 from RRC connected state, including providing RRC inactive state configuration information such as the uplink data threshold for transmission while in the RRC inactive state, timer configuration information (e.g., for T_activity, T_backoff, etc.), and/or other configuration information, and in 1008, the UE 1002 may operate in the RRC inactive state with respect to the network 1004. In 1010, uplink data arrival may occur at baseband of the UE 1002, with the amount of data being greater than the configured threshold. Accordingly, the UE 1002 may determine to resume RRC connected state, and may perform a RACH procedure to initiate the RRC resume procedure. This may include providing a message 1 (preamble) (1012), receiving a message 2 (random access response or RAR) (1014), providing a message 3 (resume request+other MAC control elements such as PHR, BSR) (1016), and receiving a message 4 (RRC resume) (1018). After the RRC resume procedure, in 1020, the UE 1002 may operate in the RRC connected state with respect to the network 1004, and may transmit the uplink data while in the RRC connected state.

FIG. 11 illustrates a scenario in which the amount of uplink data that arrives is less than a configured uplink data threshold for transmission while in the RRC inactive state. As shown, in this scenario, in 1106, the network 1104 may release the UE 1102 from RRC connected state, including providing RRC inactive state configuration information such as the uplink data threshold for transmission while in the RRC inactive state, timer configuration information (e.g., for T_activity, T_backoff, etc.), and/or other configuration information, and in 1108, the UE 1102 may operate in the RRC inactive state with respect to the network 1104. In 1110, uplink data arrival may occur at baseband of the UE 1102, with the amount of data being less than the configured threshold. In this scenario, the UE 1102 may accordingly determine to transmit the uplink data using a RACH procedure while remaining in the RRC inactive state. This may include providing a message 1 (preamble) (1112), receiving a message 2 (random access response or RAR) (1114), providing a message 3 (data+I-RNTI (e.g., as a MAC CE)+other MAC CEs) (1116), and receiving a message 4 (I-RNTI (e.g., as a MAC CE)) (1118). In the illustrated scenario, a T_activity timer may be initiated when the uplink data is transmitted. After the RACH procedure, in 1120, the UE 1102 may continue to operate in the RRC inactive state with respect to the network 1104.

FIG. 11 illustrates another scenario in which the amount of uplink data that arrives is less than a configured uplink data threshold for transmission while in the RRC inactive state. As shown, in this scenario, in 1206, the network 1204 may release the UE 1202 from RRC connected state, including providing RRC inactive state configuration information such as the uplink data threshold for transmission while in the RRC inactive state, timer configuration information (e.g., for T_activity, T_backoff, etc.), and/or other configuration information, and in 1208, the UE 1202 may operate in the RRC inactive state with respect to the network 1204. In 1210, uplink data arrival may occur at baseband of the UE 1202, with the amount of data being less than the configured threshold. In this scenario, the UE 1202 may accordingly determine to transmit the uplink data using a pre-configured grant while remaining in the RRC inactive state. Thus, in 1212, the UE 1202 may transmit the data (e.g., along with its I-RNTI as a MAC CE) using the pre-configured grant. In the illustrated scenario, a T_activity timer may be initiated when the uplink data is transmitted. After the uplink transmission using the preconfigured grant, in 1214, the UE 1202 may continue to operate in the RRC inactive state with respect to the network 1204.

Figure 13:
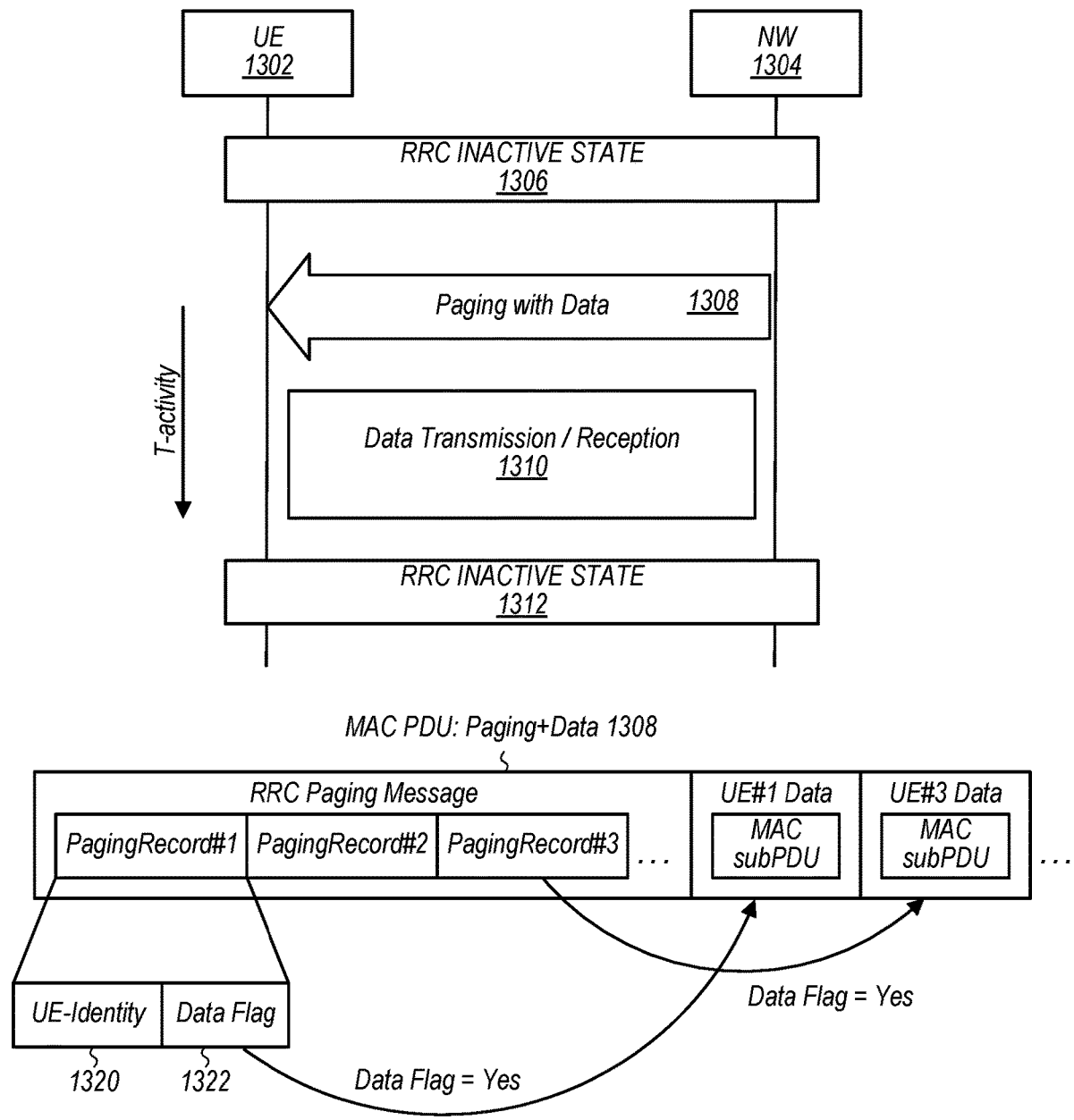
FIGS. 13-15 are communication flow diagrams illustrating various possible scenarios for performing a downlink communication while initially in an inactive state, according to some embodiments.

According to some embodiments, if the T_activity timer is not running for a UE in RRC inactive state and downlink data for the UE arrives, the network may choose to perform a downlink transmission to the UE while the UE remains in the RRC inactive state. The downlink transmission may be triggered using a RAN paging message. As one possibility, the downlink transmission may be performed by directly including the downlink data transmission in the RAN paging message. For example, the paging message could include PagingRecords+UE data 1 (i.e., length+data)+UE data 2, etc. such as to include paging and data for multiple UEs served by the RAN. In this case, based on the indication in its paging record, the UE may be able to know whether there is data following in the paging message, and may be able to find the position of the data intended for the UE in the paging message. FIG. 13 illustrates aspects of such a scenario. In the illustrated scenario, in 1306, a UE 1302 may operate in the RRC inactive state with respect to a network 1304. In 1308, the network 1304 may provide a paging message with data to the UE 1302. This may trigger initiation of the T_activity timer, such that further data transmission/reception can subsequently be performed in 1310. During and after such data transmission/reception, the UE 1302 may remain in the RRC inactive state (1312). As shown, the paging message with data 1308 can include paging records for each of multiple UEs. Thus, the paging record for the UE 1302 could include a UE-Identity field 1320 and a data flag 1322. The data flag 1322 may be set to equal a value configured to indicate that there is data for the UE 1302, such that the UE 1302 may be able to retrieve the data from the subsequent data MAC subPDU for the UE 1302.

Figure 14:
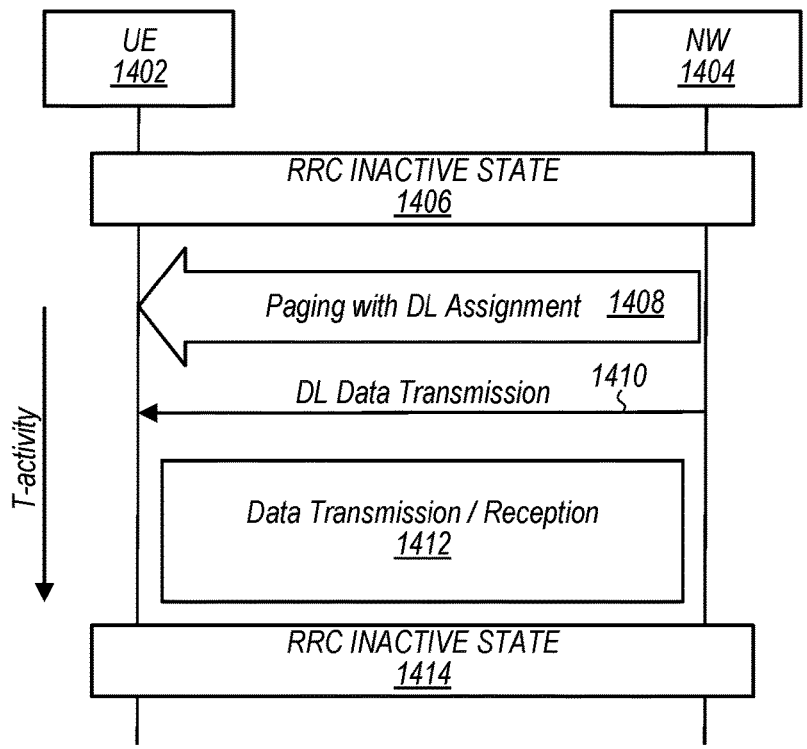
Figure 14:
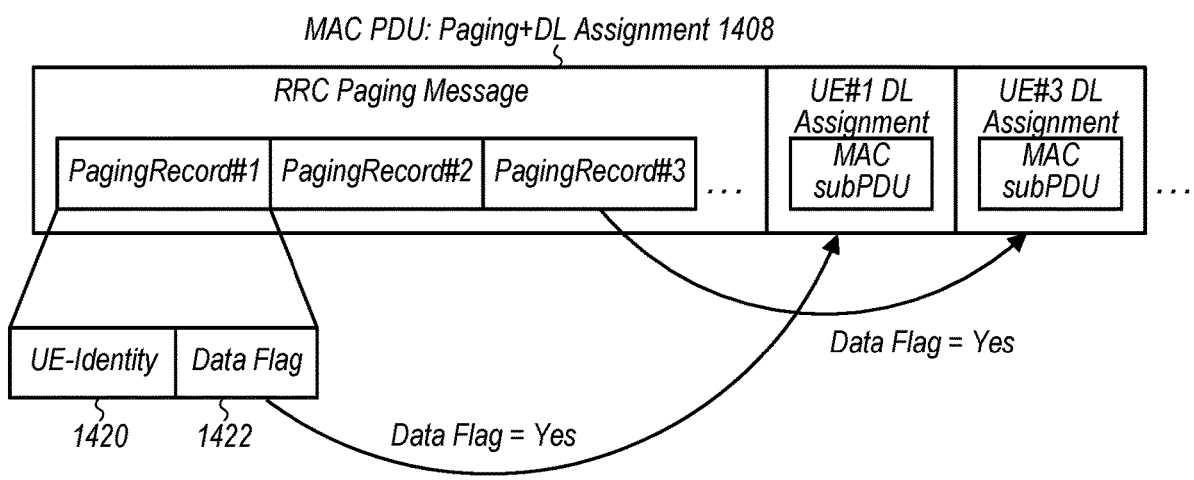

As another possibility, the downlink transmission may be performed by including downlink assignment information for the downlink data transmission in the RAN paging message. For example, the paging message could include PagingRecords+DL assignment for UE1+DL assignment for UE2, etc. such as to include paging and downlink assignments for multiple UEs served by the RAN. In this case, based on the indication in its paging record, the UE may be able to find its DL assignment for data, and may be able to receive the downlink data according to the downlink assignment. The occasion can be from the assignment, or can be pre-defined/pre-configured, according to various embodiments. FIG. 14 illustrates aspects of such a scenario. In the illustrated scenario, in 1406, a UE 1402 may operate in the RRC inactive state with respect to a network 1404. In 1408, the network 1404 may provide a paging message with downlink assignment information to the UE 1402. In 1410, the UE 1402 may receive the downlink data transmission in accordance with the downlink assignment information. This may trigger initiation of the T_activity timer, such that further data transmission/reception can subsequently be performed in 1412. During and after such data transmission/reception, the UE 1402 may remain in the RRC inactive state (1414). As shown, the paging message with downlink assignment 1408 can include paging records for each of multiple UEs. Thus, the paging record for the UE 1402 could include a UE-Identity field 1420 and a data flag 1422. The data flag 1422 may be set to equal a value configured to indicate that there is data for the UE 1402, such that the UE 1402 may be able to determine the downlink assignment information used to receive the data from the subsequent data MAC subPDU for the UE 1402.

Figure 15:
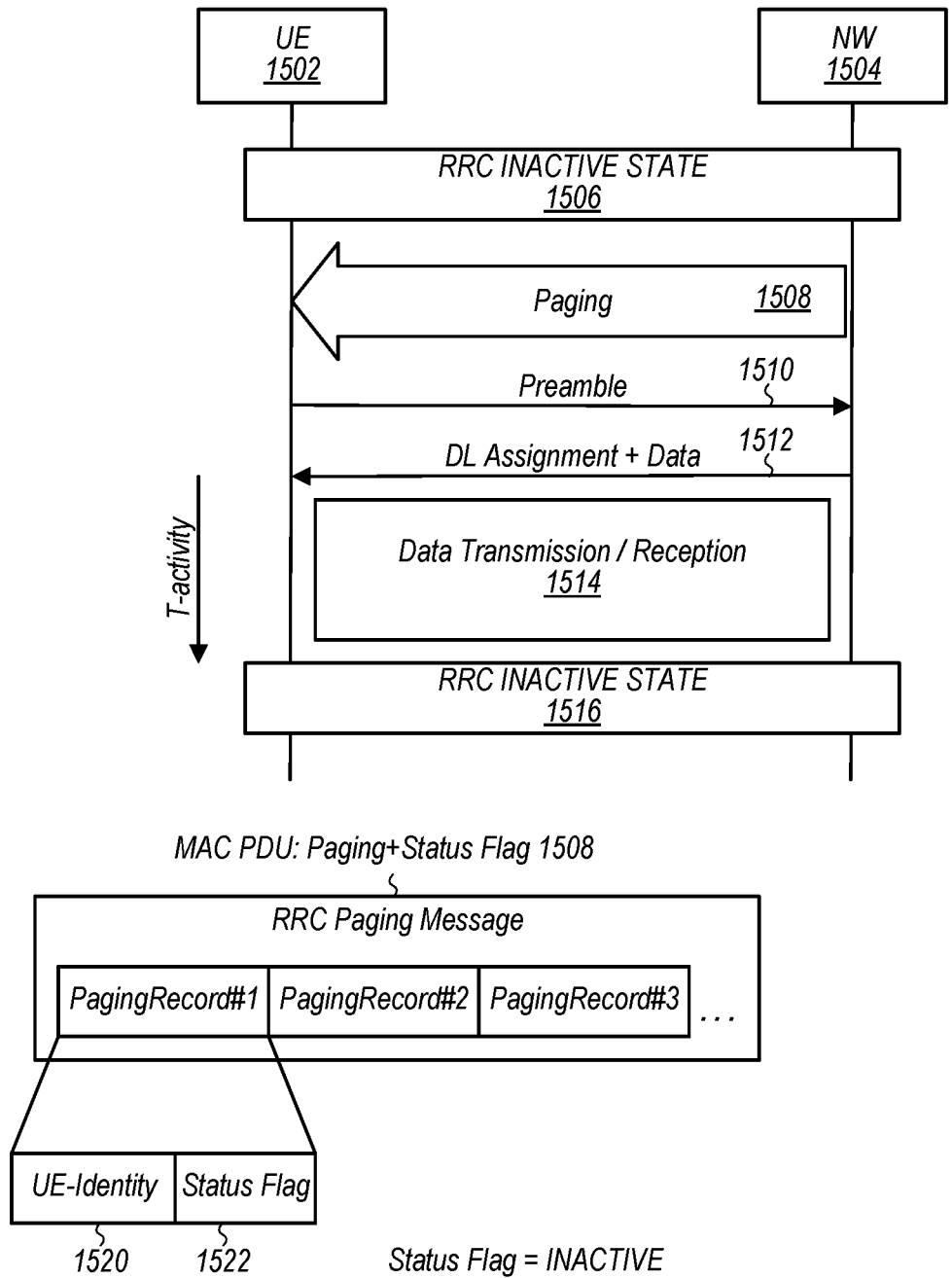

As a further possibility, the downlink transmission may be performed by including a notification in the RAN paging message of whether to remain in RRC inactive state to receive downlink data or to resume a RRC connection to receive downlink data. For example, the paging message could include a 1-bit status indicator with each PagingRecord, such as to include such a notification for each of multiple UEs served by the RAN. In this case, based on the indication in its paging record, if the indication is to stay in RRC inactive state to perform the downlink data communication, the UE may either receive the downlink data in the first available pre-configured downlink assignment (e.g., after a pre-defined/pre-configured mini-timer T), or may perform a RACH procedure to receive the downlink data (e.g., in the message 4 of the RACH procedure). FIG. 15 illustrates aspects of such a scenario. In the illustrated scenario, in 1506, a UE 1502 may operate in the RRC inactive state with respect to a network 1504. In 1508, the network 1504 may provide a paging message with a status flag to the UE 1502. In 1510, the UE 1502 may transmit a RACH preamble to the network 1504. In 1512, the network 1504 may provide a downlink assignment to the UE 1502, and the UE 1502 may receive the downlink data transmission in accordance with the downlink assignment information. This may trigger initiation of the T_activity timer, such that further data transmission/reception can subsequently be performed in 1514. During and after such data transmission/reception, the UE 1502 may remain in the RRC inactive state (1516). As shown, the paging message with status flag 1508 can include paging records for each of multiple UEs. Thus, the paging record for the UE 1502 could include a UE-Identity field 1520 and a status flag 1522. The status flag 1522 may be set to equal a value configured to indicate to the UE 1502 to remain in RRC inactive state to perform the downlink data communication.

As previously noted herein, while the T_activity timer is running, it may be the case that a UE can perform data transmission/reception while operating in the RRC inactive state. The T_activity timer may be started (and restarted) based on data transmission/reception and/or based on PDCCH scheduling. If desired, the network may configure a UE (or UEs in general) to disable T_activity restart operation, e.g., such that the T_activity timer could have a fixed length without option to be extended prior to expiry.

While the T_activity timer is running, to support data transmission/reception while operating in the RRC inactive state, the UE may be configured to monitor the PDCCH provided by its serving cell, e.g., continuously or according to an inactive state DRX pattern. The UE may perform data transmission and/or reception according to any scheduled/configured grants/assignments provided via the PDCCH. The UE may also perform radio resource management (RRM) and/or channel state information (CSI) measurements, e.g., always or according to the DRX pattern or a measurement cycle. It may be the case that the UE is not allowed to perform a RACH procedure while the T_activity timer is running, e.g., to reduce the potential for collisions.

Thus, in some respects, the UE behavior may be similar to that in the RRC connected state while the T_activity timer is running. The UE scheduling can be performed using any of various possible types of UE identity information. As one possibility, the I-RNTI, which may be the UE identity via the whole RNA while in RRC inactive state, may be used. As another possibility, a T-C-RNTI, which may be allocated in the message 2 of a RACH procedure, may be used, e.g., in case of a first transmission that is performed via a RACH procedure. As another possibility, a UE identifier that is allocated to the UE via dedicated RRC scheduling and is specifically configured for use for data transmission in RRC inactive state (e.g., a "X-RNTI") may be used. The configuration used for transmissions could be a default configuration, a common configuration (e.g., which may be derived from broadcast system information), or a dedicated configuration (e.g., which may be configured via RRC dedicated signaling when triggering the UE to transition from RRC connected state to RRC inactive state), according to various embodiments.

Figure 17:
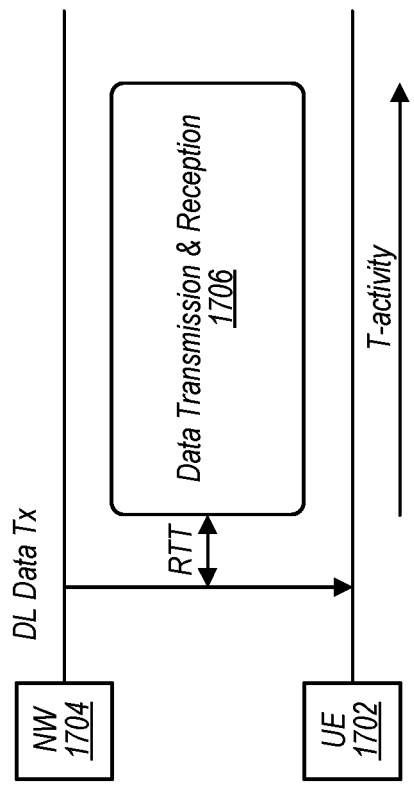
FIGS. 16-17 illustrate communication timelines showing aspects of possible use of round trip time and activity timers in conjunction with data communication in an inactive state, according to some embodiments.
Figure 16:
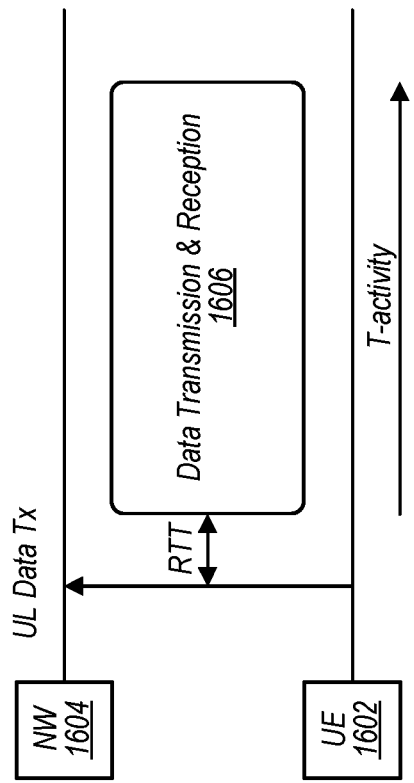

FIGS. 16-17 are communication timelines illustrating aspects of possible use of round trip time and activity timers in conjunction with data communication in inactive state, according to some embodiments. As shown, in the scenario illustrated in FIG. 16, a UE 1602 may perform an initial uplink data transmission to a network 1604, which may trigger initiation of a RTT timer, and the T_activity timer may be initiated after expiry of the RTT timer. In 1606, while the T_activity timer is running, the UE 1602 and the network 1604 may perform further data transmission and reception. As further shown, in the scenario illustrated in FIG. 17, a network 1704 may perform an initial downlink data transmission to a UE 1702, which may trigger initiation of a RTT timer, and the T_activity timer may be initiated after expiry of the RTT timer. In 1706, while the T_activity timer is running, the UE 1702 and the network 1704 may perform further data transmission and reception.

Thus, after a UE performs a first data transmission (and possibly after expiry of the RTT timer, if configured) while in RRC inactive state, the UE will start the T_activity timer. While T_activity is running, the UE may keep monitoring PDCCH scheduling, and may perform corresponding data transmission/reception based on the scheduled or pre-configured grants/assignments provided. The UE may restart the T_activity timer based on the scheduling or transmission/reception, and upon T_activity expiry, the UE may enter the RRC inactive state without data transmission.

As further previously noted, in some instances, a T_backoff timer may be configured. The T_backoff timer may be configured to operate in any of various possible ways. As one possibility, if a T_backoff timer is configured, it may be started based on an initial data transmission (or at RTT timer expiry), and the UE may wait to initiate the T_activity timer until T_backoff expiry. If new uplink data is received while T_backoff is running, the UE may refrain from initiating any uplink transmission while in RRC inactive state until T_backoff expires. Alternatively (e.g., if a T_wait timer is configured and expires prior to expiration of T_backoff), the UE may stop T_backoff and immediately transition to RRC connected state by sending a RRC connection resume request. If new downlink data arrives while the T_backoff timer is running, it may be the case that the UE is configured to stop the T_backoff timer.

Figure 18:
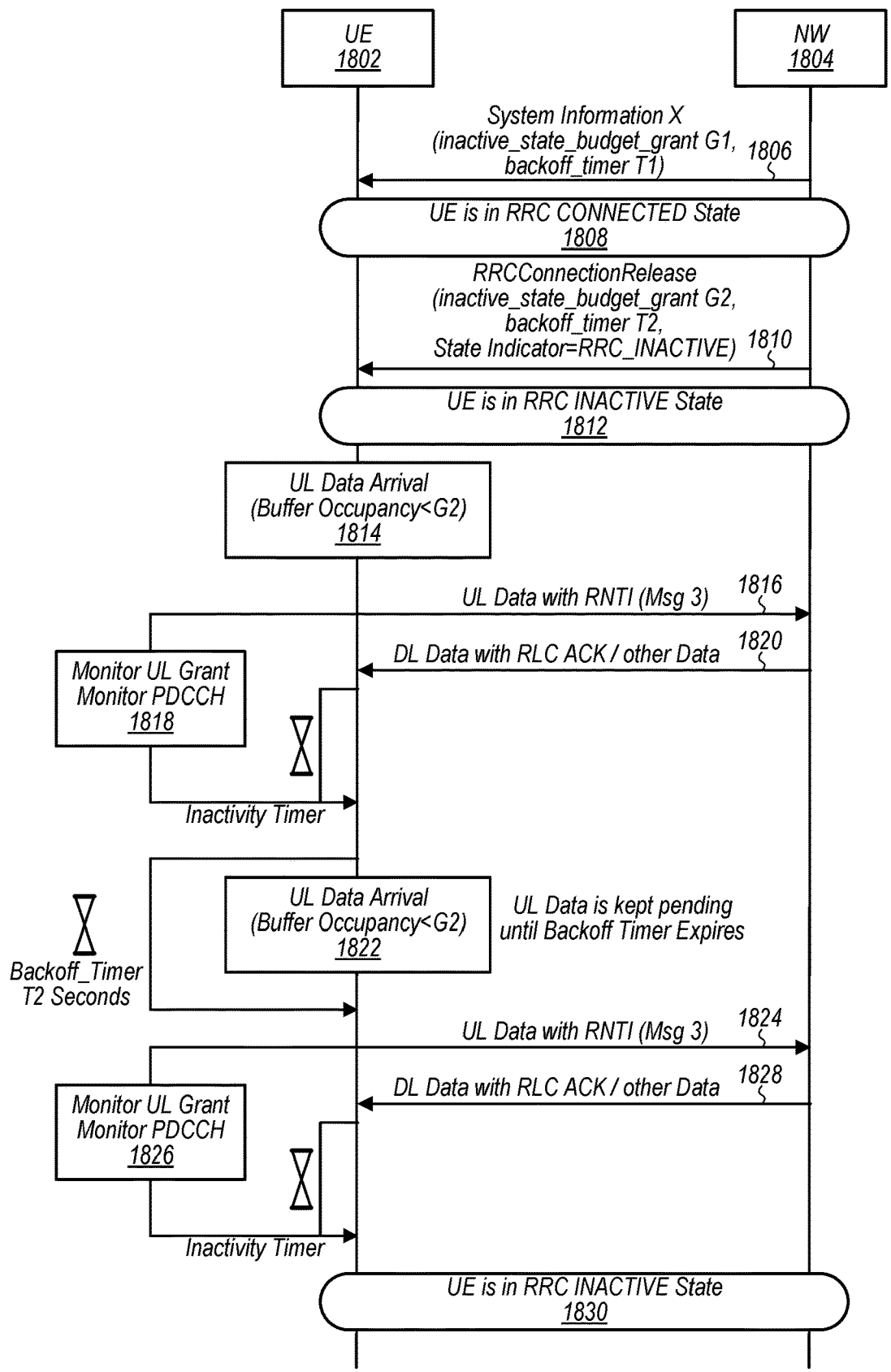
FIGS. 18-20 are communication flow diagrams illustrating various possible scenarios for using a backoff timer in conjunction with data communication in an inactive state, according to some embodiments.
Figure 19:
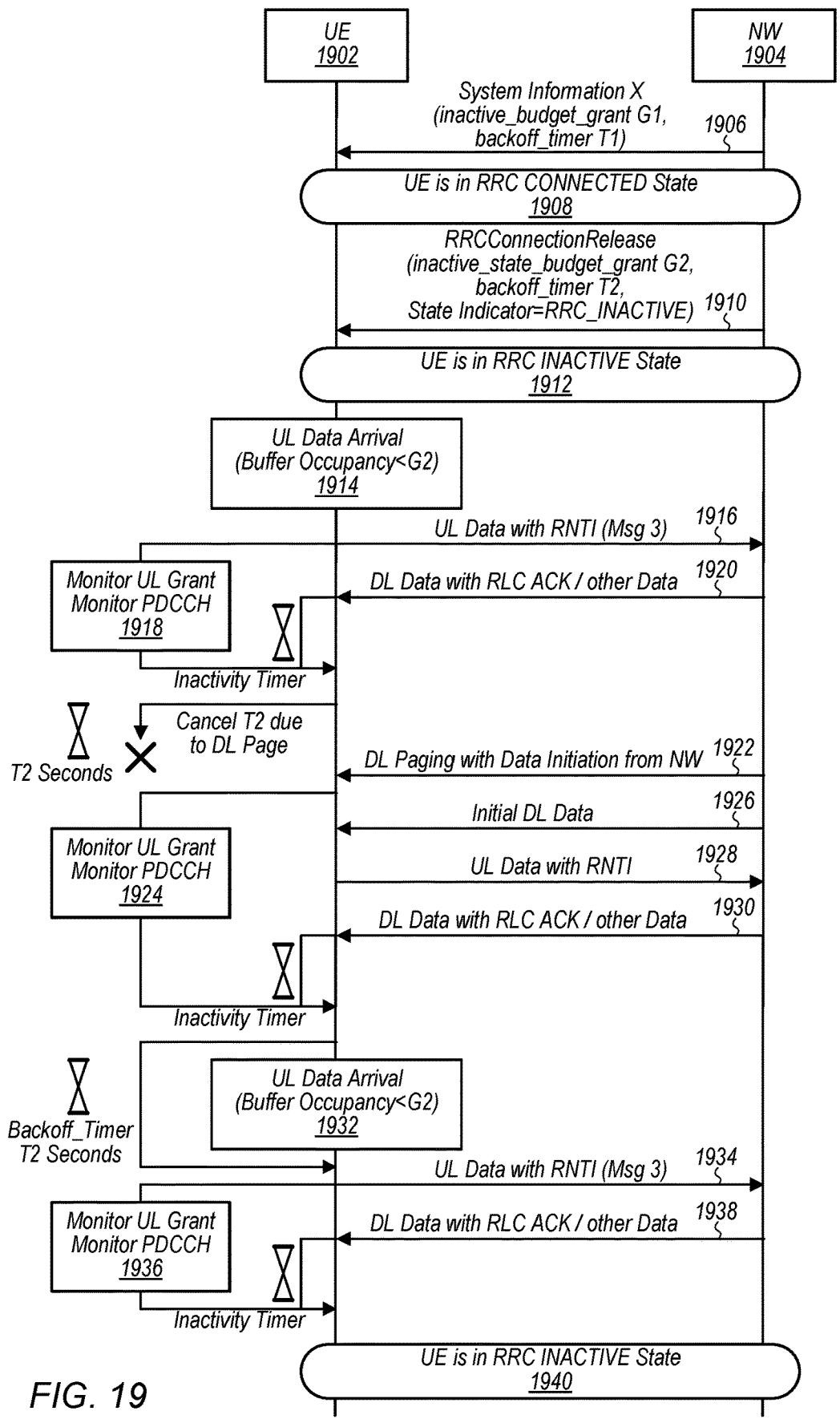
Figure 20:
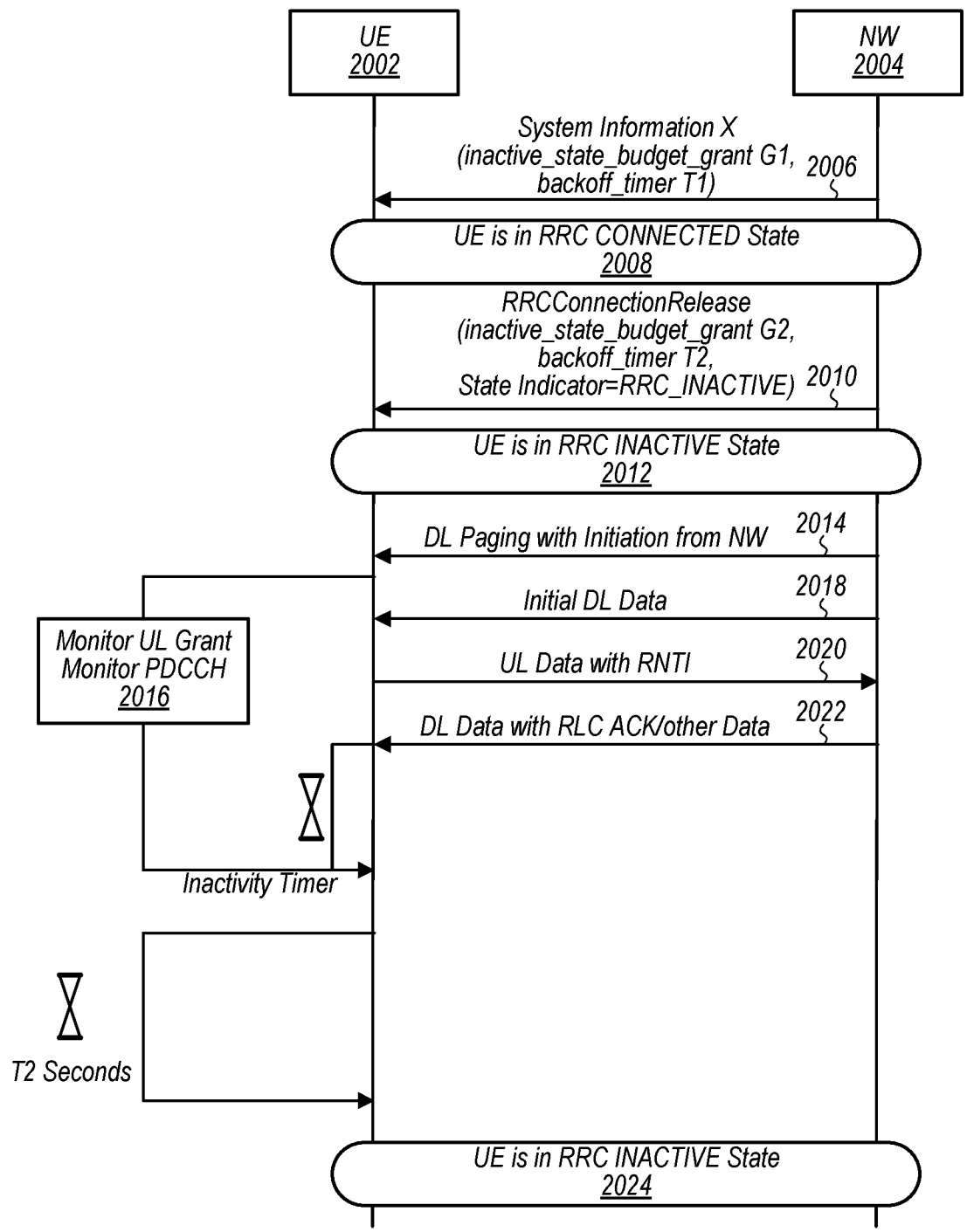

FIGS. 18-20 are communication flow diagrams illustrating various possible scenarios for using a backoff timer in conjunction with data communication in inactive state, according to some embodiments.

In the scenario of FIG. 18, in 1806, a network 1804 may provide system information (e.g., indicating a common inactive state budget grant G1, a common backoff timer value T1, etc.) to a UE 1802. In 1808, the UE 1802 and the network 1804 may establish a RRC connection. In 1810, the RRC connection may be released. In the RRC connection release message, the network 1804 may indicate UE specific configuration information (e.g., indicating a UE specific inactive state budget grant G2, a UE specific backoff timer value T2, etc.) to the UE 1802. In 1812, the UE 1802 may operate in a RRC inactive state with respect to the network 1804. In 1814, uplink data arrival may occur at baseband of the UE 1802, with the buffer occupancy of the UE being less than the UE specific inactive state budget grant G2. In this scenario, in 1816, the UE may transmit the uplink data with RNTI information for the UE. This may trigger initiation of the T_activity inactivity timer, such that in 1818, the UE may monitor the PDCCH and uplink grants. In 1820, the network 1804 may provide downlink data with RLC acknowledgement and/or other data, e.g., while the inactivity timer is running. In 1822, after expiry of the inactivity timer, further uplink data may arrive, with the buffer occupancy of the UE being less than the UE specific inactive state budget grant G2. This may trigger initiation of the backoff timer with length T2, and the uplink data may be kept pending until the backoff timer expires. After expiry of the backoff timer, in 1824, the UE may proceed to transmit the uplink data with RNTI information for the UE. This may again trigger initiation of the T_activity inactivity timer, such that in 1826, the UE may monitor the PDCCH and uplink grants. In 1828, the network 1804 may provide downlink data with RLC acknowledgement and/or other data, e.g., while the inactivity timer is running. In 1830, after expiry of the inactivity timer, the UE may remain in the RRC inactive state.

In the scenario of FIG. 19, in 1906, a network 1904 may provide system information (e.g., indicating a common inactive state budget grant G1, a common backoff timer value T1, etc.) to a UE 1902. In 1908, the UE 1902 and the network 1904 may establish a RRC connection. In 1910, the RRC connection may be released. In the RRC connection release message, the network 1904 may indicate UE specific configuration information (e.g., indicating a UE specific inactive state budget grant G2, a UE specific backoff timer value T2, etc.) to the UE 1902. In 1912, the UE 1902 may operate in a RRC inactive state with respect to the network 1904. In 1914, uplink data arrival may occur at baseband of the UE 1902, with the buffer occupancy of the UE being less than the UE specific inactive state budget grant G2. In this scenario, in 1916, the UE may transmit the uplink data with RNTI information for the UE. This may trigger initiation of the T_activity inactivity timer, such that in 1918, the UE may monitor the PDCCH and uplink grants. In 1920, the network 1904 may provide downlink data with RLC acknowledgement and/or other data, e.g., while the inactivity timer is running. After expiry of the inactivity timer, the backoff timer may be initiated with length T2 but in 1922, the backoff timer T2 may be cancelled due to downlink paging with data initiation from the network 1904. This may again trigger initiation of the T_activity inactivity timer, such that in 1924, the UE may monitor the PDCCH and uplink grants. In 1926, the initial downlink data may be transmitted, in 1928, uplink data with RNTI may be transmitted, and in 1930, downlink data with RLC ACK and/or other data may be transmitted. After such data communications, the inactivity timer may expire, and the backoff timer T2 may again be initiated. In 1932, further uplink data may arrive, with the buffer occupancy of the UE being less than the UE specific inactive state budget grant G2, and the uplink data may be kept pending until the backoff timer expires. After expiry of the backoff timer, in 1934, the UE may proceed to transmit the uplink data with RNTI information for the UE. This may again trigger initiation of the T_activity inactivity timer, such that in 1936, the UE may monitor the PDCCH and uplink grants. In 1938, the network 1904 may provide downlink data with RLC acknowledgement and/or other data, e.g., while the inactivity timer is running. In 1940, after expiry of the inactivity timer, the UE may remain in the RRC inactive state.

In the scenario of FIG. 20, in 2006, a network 2004 may provide system information (e.g., indicating a common inactive state budget grant G1, a common backoff timer value T1, etc.) to a UE 2002. In 2008, the UE 2002 and the network 2004 may establish a RRC connection. In 2010, the RRC connection may be released. In the RRC connection release message, the network 2004 may indicate UE specific configuration information (e.g., indicating a UE specific inactive state budget grant G2, a UE specific backoff timer value T2, etc.) to the UE 2002. In 2012, the UE 2002 may operate in a RRC inactive state with respect to the network 2004. In 2014, downlink data for the UE 2002 may arrive at the network 2004, and the network 2004 may perform downlink paging to the UE 2002. This may trigger initiation of the T_activity inactivity timer, such that in 2016, the UE may monitor the PDCCH and uplink grants. In 2018, the network 2004 may provide the initial downlink data, in 2020, uplink data with RNTI may be transmitted, and in 2022, downlink data with RLC ACK and/or other data may be transmitted. After such data communications, the inactivity timer may expire, and the backoff timer T2 may be initiated. In this scenario, no uplink or downlink data may arrive while the backoff timer is running, and in 2024, after expiry of the backoff timer, the UE may remain in the RRC inactive state.

In some instances, it may be possible for a UE to camp on a new cell (e.g., perform cell re-selection) within the same RNA during a data communication while in RRC inactive state. In such a scenario, the UE may stop the data inactivity timer if it is running, discard the buffered data in RLC/MAC/PHY, regard the corresponding protocol data units as unsuccessfully delivered, and retransmit the data in the new camped cell. The UE can trigger a RRC resume procedure or trigger data transmission in RRC inactive state in the new camped cell. In case of triggering the data retransmission in RRC inactive state in the new camped cell, if data is available in the uplink buffer of the UE, the UE may trigger an initial uplink transmission in RRC inactive state with the new camped cell. If no data is available in the uplink buffer, e.g., such that the ongoing data communication included downlink data being received from the previous cell, the UE may trigger downlink transmission in the new camped cell, e.g., using a RACH procedure, with the UE identity indicated using the I-RNTI. In some instances, the UE may further indicate that the UE is waiting for a downlink transmission that was initiated in the previous cell, e.g., by indicating a cell identifier of the previous cell.

In the following further exemplary embodiments are provided.

One set of embodiments may include an apparatus, comprising: a processor configured to cause a wireless device to: establish a radio resource control (RRC) connection with a cell provided by a cellular base station; transition to a RRC inactive state; and perform data communication with the cell while in the RRC inactive state.

According to some embodiments, the processor is further configured to cause the wireless device to: determine whether to perform the data communication with the cell while in the RRC inactive state or to resume RRC connected state to perform the data communication based at least in part on an amount of data to be communicated.

According to some embodiments, wherein the processor is further configured to cause the wireless device to: determine whether to perform the data communication with the cell while in the RRC inactive state or to resume RRC connected state to perform the data communication based at least in part on configuration information received from the cellular base station.

According to some embodiments, the data communication comprises a downlink communication, wherein data for the downlink communication is included in a paging message received by the wireless device.

According to some embodiments, the data communication comprises a downlink communication, wherein downlink assignment information for the downlink communication is included in a paging message received by the wireless device.

According to some embodiments, the data communication includes an uplink data communication that includes a I-RNTI to identify the wireless device to the cellular base station based at least in part on the data communication being performed while the wireless device is in the RRC inactive state.

According to some embodiments, the processor is further configured to cause the wireless device to: initiate an inactive state inactivity timer based at least in part on performing the data communication with the cell while in the RRC inactive state; monitor a control channel of the cell while the inactive state inactivity timer is running; and perform one or more additional data communications with the cell while the inactive state inactivity timer is running if one or more additional data communications with the cell are scheduled for the wireless device while the inactive state inactivity timer is running; wherein the inactive state inactivity timer is reset based on a data communication being performed while the inactive state inactivity timer is running and/or based on scheduling information received by the wireless device while the inactive state inactivity timer is running.

Another set of embodiments may include a wireless device, comprising: an antenna; a radio operably coupled to the antenna; and a processor operably coupled to the radio; wherein the wireless device is configured to: establish a radio resource control (RRC) connection with a cell provided by a cellular base station; transition from RRC connected state to RRC inactive state; and determine whether to perform a data communication while in the RRC inactive state or to resume RRC connected state to perform the data communication.

According to some embodiments, the wireless device is further configured to: determine to perform the data communication while in the RRC inactive state; and perform the data communication using a pre-configured grant.

According to some embodiments, the wireless device is further configured to: determine to perform the data communication while in the RRC inactive state; and perform the data communication during a random access channel (RACH) procedure.

According to some embodiments, the data communication comprises a downlink communication, wherein an indication of whether to perform the data communication while in the RRC inactive state or to resume RRC connected state to perform the data communication is included in a paging message received by the wireless device.

According to some embodiments, whether to perform the data communication while in the RRC inactive state or to resume RRC connected state to perform the data communication is determined based at least in part on whether an amount of data to be communicated is less than a data threshold for performing data communication while in the RRC inactive state.

According to some embodiments, the wireless device is further configured to: initiate a round trip time (RTT) timer when a first data communication while in the RRC inactive state is performed, wherein the wireless device is configured to refrain from performing data communication while the RTT timer is running.

According to some embodiments, the wireless device is further configured to: initiate a backoff timer when uplink data is received at a baseband layer of the wireless device from a higher layer of the wireless device while the wireless device is in the RRC inactive state; wherein the wireless device is configured to refrain from performing data communication while in RRC inactive state while the backoff timer is running.

According to some embodiments, the wireless device is further configured to: initiate a waiting timer when uplink data is received at a baseband layer of the wireless device from a higher layer of the wireless device while the wireless device is in the RRC inactive state; perform an uplink communication while in the RRC inactive state to transmit the uplink data if one or more conditions for performing an uplink communication while in the RRC inactive state are met prior to expiration of the waiting timer; and resume RRC connected state to transmit the uplink data if the waiting timer expires.

Yet another set of embodiments may include a method, comprising: by a wireless device: establishing a radio resource control (RRC) connection with a first cell provided by a cellular base station; transitioning from RRC connected state to RRC inactive state; and performing a data communication while in the RRC inactive state.

According to some embodiments, the data communication includes an uplink communication, wherein the uplink communication is performed using one of: an uplink data grant configured for use while in RRC inactive state; or a random access channel (RACH) procedure.

According to some embodiments, the data communication includes a downlink communication, wherein the method further comprises one or more of: receiving the downlink communication in a paging message for the wireless device; receiving assignment information for the downlink communication in a paging message for the wireless device; or receiving an indication of whether to perform the downlink communication while in the RRC inactive state or to resume RRC connected state to perform the downlink communication in a paging message for the wireless device.

According to some embodiments, the method further comprises: performing cell re-selection to a second cell prior to completing the data communication; and performing the data communication with the second cell while in the RRC inactive state based at least in part on the cell re-selection to the second cell being performed prior to completing the data communication.

According to some embodiments, the method further comprises: performing cell re-selection to a second cell prior to completing the data communication; and resuming RRC connected state to perform the data communication with the second cell based at least in part on the cell re-selection to the second cell being performed prior to completing the data communication.

Another exemplary embodiment may include a device, comprising: an antenna; a radio coupled to the antenna; and a processing element operably coupled to the radio, wherein the device is configured to implement any or all parts of the preceding examples.

A yet further exemplary embodiment may include a non-transitory computer accessible memory medium comprising program instructions which, when executed at a device, cause the device to implement any or all parts of any of the preceding examples.

A still further exemplary embodiment may include a computer program comprising instructions for performing any or all parts of any of the preceding examples.

Yet another exemplary embodiment may include an apparatus comprising means for performing any or all of the elements of any of the preceding examples.

Still another exemplary embodiment may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:
1. An apparatus for wireless communication, comprising:
at least one processor configured to cause a base station to:
generate and transmit radio resource control (RRC) signaling to transition a wireless device to a RRC inactive state from a RRC connected state, wherein the RRC signaling includes a configuration of physical resources for data transmission in the RRC inactive state;
exchange data communication with the wireless device while the wireless device is in the RRC inactive state, wherein exchanging the data communication includes receiving uplink data using the physical resources and one of a pre-configured grant or a random access channel (RACH) procedure; and receive a first transmission of uplink data communication including an inactive radio network temporary identifier (I-RNTI), wherein a timer associated with the data communication with the wireless device while the wireless device is in the RRC inactive state starts at the first transmission, wherein the data communication with the wireless device while the wireless device is in the RRC inactive state ends when the timer expires.

2. The apparatus of claim 1, wherein said exchanging data communication with the wireless device is based on a data amount to be transmitted being below a threshold.

3. The apparatus of claim 2, wherein the RRC signaling includes the threshold.

4. The apparatus of claim 2, wherein when the data amount transmitted is not below the threshold, an RRC connected state is resumed to exchange the data communication.

5. The apparatus of claim 1, wherein the data communication comprises a downlink communication, wherein data for the downlink communication is included in a paging message transmitted by the base station.

6. The apparatus of claim 1, wherein the data communication comprises a downlink communication, wherein downlink assignment information for the downlink communication is included in a paging message transmitted by the base station.

7. A method for operating a base station, comprising:
by the base station:
generating and transmitting radio resource control (RRC) signaling to transition a wireless device to a RRC inactive state from a RRC connected state, wherein the RRC signaling includes a configuration of physical resources for data transmission in the RRC inactive state;
wirelessly communicating data with the wireless device while the wireless device is in the RRC inactive state, wherein said wirelessly communicating the data includes receiving uplink data using the physical resources and one of a pre-configured grant or a random access channel (RACH) procedure; and
receiving a first transmission of uplink data communication including an inactive radio network temporary identifier (I-RNTI), wherein a timer associated with the data communication with the wireless device while the wireless device is in the RRC inactive state starts at the first transmission, wherein the data communication with the wireless device while the wireless device is in the RRC inactive state ends when the timer expires.

8. The method of claim 7, wherein said wirelessly communicating data with the wireless device is based on a data amount to be transmitted being below a threshold.

9. The method of claim 8, wherein the RRC signaling includes the threshold.

10. The method of claim 8, wherein when the data amount transmitted is not below the threshold, an RRC connected state is resumed to perform the data communication.

11. The method of claim 7, wherein the data communication comprises a downlink communication, wherein data for the downlink communication is included in a paging message transmitted by the base station.

12. The method of claim 7, wherein the data communication comprises a downlink communication, wherein downlink assignment information for the downlink communication is included in a paging message transmitted by the base station.

13. A non-transitory, computer accessible memory medium storing program instructions executable by at least one processor to cause a base station to:
generate and transmit radio resource control (RRC) signaling to transition a wireless device to a RRC inactive state from a RRC connected state, wherein the RRC signaling includes a configuration of physical resources for data transmission in the RRC inactive state;
exchange data communication with the wireless device while the wireless device is in the RRC inactive state, wherein exchanging the data communication includes receiving uplink data using the physical resources and one of a pre-configured grant or a random access channel (RACH) procedure; and
receive a first transmission of uplink data communication including an inactive radio network temporary identifier (I-RNTI), wherein a timer associated with the data communication with the wireless device while the wireless device is in the RRC inactive state starts at the first transmission, wherein the data communication with the wireless device while the wireless device is in the RRC inactive state ends when the timer expires.

14. The non-transitory, computer accessible memory medium of claim 13, wherein said exchanging data communication with the wireless device is based on a data amount to be transmitted being below a threshold.

15. The non-transitory, computer accessible memory medium of claim 14, wherein the RRC signaling includes the threshold.

16. The non-transitory, computer accessible memory medium of claim 14, wherein when the data amount transmitted is not below the threshold, an RRC connected state is resumed to perform the data communication.

17. The non-transitory, computer accessible memory medium of claim 13, wherein the program instructions are further executable to:
generate and transmit a downlink communication while the wireless device is in the RRC inactive state, wherein data for the downlink communication is included in a paging message transmitted by the base station.

18. The non-transitory, computer accessible memory medium of claim 13, wherein the program instructions are further executable to:
generate and transmit a downlink communication while the wireless device is in the RRC inactive state, wherein downlink assignment information for the downlink communication is included in a paging message transmitted by the base station.

* * * * *